US009192541B2

(12) United States Patent
Liu

(10) Patent No.: US 9,192,541 B2
(45) Date of Patent: Nov. 24, 2015

(54) FOLDABLE WALKER APPARATUS

(71) Applicant: EVOLUTION TECHNOLOGIES INC., Port Coquitlam (CA)

(72) Inventor: Julian Liu, Port Moody (CA)

(73) Assignee: EVOLUTION TECHNOLOGIES INC., Port Coquitlam (CA)

(*) Notice: Subject to any disclaimer, the term of this patent is extended or adjusted under 35 U.S.C. 154(b) by 164 days.

(21) Appl. No.: 13/858,563

(22) Filed: Apr. 8, 2013

(65) Prior Publication Data

US 2014/0175841 A1 Jun. 26, 2014

Related U.S. Application Data

(62) Division of application No. 13/270,440, filed on Oct. 11, 2011, now Pat. No. 8,517,399, which is a division of application No. 12/247,781, filed on Oct. 8, 2008, now Pat. No. 8,083,239.

(51) Int. Cl.
*B62B 1/12* (2006.01)
*A61H 3/04* (2006.01)
(Continued)

(52) U.S. Cl.
CPC .. *A61H 3/04* (2013.01); *A61G 5/02* (2013.01); *A61H 3/00* (2013.01); *A61H 2003/002* (2013.01); *A61H 2003/046* (2013.01);
(Continued)

(58) Field of Classification Search
CPC .............. A61H 3/04; A61H 2003/046; A61H 2201/0161; A61H 2201/1633; A61G 2005/0891; A61G 5/08
See application file for complete search history.

(56) References Cited

U.S. PATENT DOCUMENTS

| | | | |
|---|---|---|---|
| 188,835 | A | 3/1877 | Allen |
| 291,351 | A | 1/1884 | Jackson |
| 522,117 | A | 6/1894 | Humphrey |

(Continued)

FOREIGN PATENT DOCUMENTS

| | | |
|---|---|---|
| AT | 214095 | 3/1961 |
| AT | 242315 | 9/1965 |

(Continued)

OTHER PUBLICATIONS

A web printout screen shot of http://web.archive.org/web/20080919040758/http://www.dolomite.biz/dolomite/dolomite-jazz.php (exhibit TT-34) dated Feb. 14, 2008.

(Continued)

*Primary Examiner* — Brodie Follman
(74) *Attorney, Agent, or Firm* — Cameron IP

(57) ABSTRACT

There is a provided a collapsible walker. The walker includes a pair of spaced-apart, arc-shaped support members. Each support member has a proximal end, a distal end and an apex spaced therebetween. Respective rods extend from the distal ends towards the proximal ends of the support members. A seat extends between and connects to the apexes of the support members. A basket with a pair of spaced-apart ends members operatively connects to and extends between the support members. The end members are positioned adjacent to the distal ends of the support members. Each end member operatively connects to both a respective one of the rods and a respective one of the support members. The walker includes a pair of connection brackets for connecting the end members to the walker. Each connection bracket extends from a respective one of the support members to a respective one of the rods.

19 Claims, 24 Drawing Sheets

(51) Int. Cl.
*A61G 5/02* (2006.01)
*A61H 3/00* (2006.01)

(52) U.S. Cl.
CPC . *A61H2201/0161* (2013.01); *A61H 2201/0192* (2013.01); *A61H 2201/1633* (2013.01)

(56) References Cited

U.S. PATENT DOCUMENTS 534,443 A 2/1895 Manguine
879,803 A 2/1908 Vlasak
1,767,925 A 6/1930 Hargreaves
2,169,860 A 8/1939 Von Hoom
2,356,793 A 8/1944 O'Connor et al.
2,483,307 A 9/1949 Wheary, Jr.
2,631,655 A 3/1953 Jannello
2,656,881 A 10/1953 Hamilton
2,681,809 A 6/1954 Hamill
2,710,084 A 6/1955 Braverman
2,732,047 A 1/1956 Finkelstein
2,864,466 A 12/1958 Taylor
2,866,495 A 12/1958 Diehl et al.
2,937,248 A 5/1960 Michetti
2,987,149 A 6/1961 Finkelstein
3,018,506 A 1/1962 Haydock
3,061,049 A 10/1962 Bramley
3,109,899 A 11/1963 Pastene
3,142,351 A 7/1964 Green
3,194,577 A 7/1965 Berlin
3,268,965 A 8/1966 Arthur
3,288,250 A 11/1966 Oja et al.
3,376,400 A 4/1968 Batt at al.
3,409,105 A 11/1968 Clinton
3,690,652 A 9/1972 Schneider
3,692,155 A 9/1972 Laurita
3,890,668 A 6/1975 Stosberg et al.
3,903,944 A 9/1975 Montgomery et al.
3,927,727 A 12/1975 Hanagan
3,969,964 A 7/1976 George et al.
4,029,279 A 6/1977 Nakatani
4,029,311 A 6/1977 Chanslor et al.
4,056,115 A 11/1977 Thomas
4,087,141 A 5/1978 Roberts
4,116,464 A 9/1978 Haley
4,149,721 A 4/1979 Strickland
4,184,618 A 1/1980 Jones
4,185,936 A 1/1980 Takahashi
4,261,561 A 4/1981 Ilon
4,286,401 A 9/1981 Pachmayr et al.
4,325,561 A 4/1982 Lynn
4,371,183 A 2/1983 Dion
4,384,713 A 5/1983 Deutsch et al.
4,414,702 A 11/1983 Neumann
4,415,198 A 11/1983 Brearley
4,449,750 A 5/1984 Pultman
4,460,188 A 7/1984 Maloof
4,462,138 A 7/1984 Black
4,477,098 A * 10/1984 Minnebraker ........... A61G 5/00 280/250.1
4,493,488 A 1/1985 Panaia et al.
4,494,271 A 1/1985 Perlin et al.
4,509,662 A 4/1985 Weiss
4,570,370 A 2/1986 Smith et al.
4,572,409 A 2/1986 Finnegan
4,596,484 A 6/1986 Nakatani
4,659,099 A 4/1987 Malone
4,669,146 A 6/1987 Saito et al.
4,676,416 A 6/1987 Harmon
4,722,114 A 2/1988 Neumann
4,740,010 A 4/1988 Moskovitz
4,761,092 A 8/1988 Nakatani
4,765,644 A 8/1988 Bell
4,800,911 A 1/1989 Endres et al.
4,800,991 A 1/1989 Miller
4,830,035 A 5/1989 Liu
4,856,123 A 8/1989 Henderson et al.
4,883,317 A 11/1989 Davenport
4,890,355 A 1/1990 Schulten
4,907,794 A 3/1990 Rose
4,907,839 A 3/1990 Rose et al.
4,913,452 A 4/1990 Zun
4,930,697 A 6/1990 Takahashi et al.
4,974,760 A 12/1990 Miller
5,012,963 A 5/1991 Rosenbaum
5,020,560 A 6/1991 Turbeville
5,046,748 A 9/1991 Oat-Judge
5,103,530 A 4/1992 Andrisin et al.
5,109,569 A 5/1992 Shaw
5,158,313 A 10/1992 Becker
5,167,048 A 12/1992 Geiger et al.
5,188,139 A 2/1993 Garelick
5,269,157 A 12/1993 Ciminelli et al.
5,279,180 A 1/1994 Henriksson
5,293,965 A 3/1994 Nagano
5,294,027 A 3/1994 Plastina
5,348,336 A 9/1994 Fernie et al.
5,353,824 A 10/1994 Woods et al.
5,356,237 A 10/1994 Sung
5,380,034 A 1/1995 Wilson
5,429,377 A 7/1995 Duer
5,433,235 A 7/1995 Miric et al.
5,465,745 A 11/1995 Davis
5,465,986 A 11/1995 MacRae
5,475,896 A 12/1995 Wang
5,482,189 A 1/1996 Dentler et al.
5,499,697 A 3/1996 Trimble et al.
5,513,789 A 5/1996 Woods et al.
5,527,096 A * 6/1996 Shimer ................ A47D 15/006 297/130
5,531,238 A 7/1996 Azzarelli et al.
5,551,413 A 9/1996 Walk
5,593,461 A 1/1997 Reppert et al.
5,594,974 A 1/1997 Wattron et al.
5,605,345 A 2/1997 Erfurth et al.
5,621,997 A 4/1997 Pearce
5,622,404 A 4/1997 Menne
5,632,362 A 5/1997 Leitner
5,639,052 A 6/1997 Sauve
5,640,741 A 6/1997 Yano
5,662,342 A 9/1997 Basharat
5,687,984 A 11/1997 Samuel
5,692,762 A 12/1997 Obitts
5,722,717 A 3/1998 Rettenberger
5,772,234 A * 6/1998 Luo ......................... A61G 5/00 280/47.38
5,774,936 A 7/1998 Vetter
5,775,352 A 7/1998 Obitts
5,813,582 A 9/1998 Wright
5,816,650 A 10/1998 Lucas, Jr.
5,865,065 A 2/1999 Chiu
5,896,779 A 4/1999 Biersteker et al.
5,901,891 A 5/1999 Douglass
5,915,712 A 6/1999 Stephenson et al.
5,927,441 A 7/1999 Luo
5,953,962 A 9/1999 Hewson
5,954,161 A 9/1999 Lee
6,032,765 A 3/2000 Hsi-Chia
6,047,439 A 4/2000 Stearn
6,079,290 A 6/2000 Li
6,079,894 A 6/2000 Obitts
6,082,468 A 7/2000 Pusateri et al.
6,098,487 A 8/2000 Chien
6,099,002 A 8/2000 Uchiyama
6,112,446 A 9/2000 Förster et al.
6,135,475 A 10/2000 Brown et al.
6,142,526 A 11/2000 Katz
6,161,896 A 12/2000 Johnson et al.
6,189,914 B1 2/2001 Worth et al.
6,192,772 B1 2/2001 Huang
6,196,562 B1 3/2001 Zhuang
6,202,502 B1 3/2001 Chung-Che
6,216,825 B1 4/2001 Hung
6,283,484 B1 9/2001 Malstrom
6,296,261 B1 10/2001 deGoma

(56) References Cited

U.S. PATENT DOCUMENTS 6,296,263 B1 10/2001 Schultz et al.
6,311,708 B1 11/2001 Howle
6,318,392 B1 11/2001 Chen
6,338,355 B1 1/2002 Cheng
6,338,493 B1 1/2002 Wohlgemuth et al.
6,340,168 B1 1/2002 Woleen
6,354,619 B1 3/2002 Kim
6,364,070 B1 4/2002 Chen
6,371,142 B1 4/2002 Battiston
6,378,883 B1 4/2002 Epstein
6,386,575 B1 5/2002 Turner
6,401,321 B2 6/2002 Carey et al.
6,409,196 B1 6/2002 McFarland
6,442,797 B1 9/2002 Yang et al.
6,467,785 B2 10/2002 Toppses
6,491,318 B1 12/2002 Galt et al.
6,494,469 B1 12/2002 Hara et al.
6,502,280 B2 1/2003 Looker
6,527,136 B1 3/2003 Sabounjian
6,584,641 B1 7/2003 Milbredt
6,604,789 B1 8/2003 Downing
6,647,825 B1 11/2003 Lin
6,651,994 B2 11/2003 Hallgrimsson et al.
6,655,702 B2 12/2003 Senger
6,659,478 B2 12/2003 Hallgrimsson et al.
6,688,633 B2 * 2/2004 van't Schip .............. A61H 3/04 135/67
6,754,936 B2 6/2004 Ereñaga
6,755,285 B1 6/2004 Wu
6,769,701 B1 8/2004 Clausen
6,817,066 B1 11/2004 Williams et al.
6,837,503 B2 1/2005 Chen et al.
D501,432 S * 2/2005 Møller ..................... A61H 3/04 D12/130
6,877,519 B2 4/2005 Fink
6,886,575 B2 5/2005 Diamond
6,889,998 B2 5/2005 Sterns et al.
7,052,030 B2 5/2006 Serhan
7,090,239 B2 8/2006 Yoshie et al.
7,108,004 B2 9/2006 Cowie et al.
7,182,179 B2 2/2007 Tolfsen
7,211,744 B2 5/2007 Jorgensen
7,219,906 B2 5/2007 Hallgrimsson et al.
7,231,689 B2 6/2007 Scheiber et al.
7,278,436 B2 10/2007 Gale et al.
7,306,246 B2 12/2007 Gale
7,353,566 B2 4/2008 Scheiber et al.
7,377,285 B2 * 5/2008 Karasin .................... A61H 3/04 135/66
7,383,611 B2 6/2008 Foster
7,384,058 B2 6/2008 Munsey et al.
7,410,179 B2 8/2008 Lönkvist
7,422,550 B1 9/2008 Pinero et al.
7,445,216 B1 11/2008 Chou
7,494,138 B2 2/2009 Graham
7,500,689 B2 3/2009 Pasternak et al.
7,559,560 B2 7/2009 Li et al.
7,587,852 B1 9/2009 Harms
7,775,547 B2 8/2010 Dotsey et al.
7,828,305 B2 11/2010 Meyers et al.
7,837,205 B2 11/2010 Simard
7,926,834 B2 4/2011 Willis
7,980,415 B2 7/2011 Crawley
7,984,724 B1 7/2011 Eberle
8,002,363 B2 8/2011 Cheng
8,020,679 B2 9/2011 Wu
8,083,239 B2 * 12/2011 Liu .......................... A61H 3/04 135/67
8,157,273 B2 4/2012 Bar-Lev
8,167,351 B2 5/2012 Plowman
8,251,380 B2 8/2012 Liu
8,251,391 B2 8/2012 Kohler et al.
8,424,215 B2 4/2013 Quintiliani et al.
8,434,171 B2 5/2013 Wang
8,448,960 B2 5/2013 Liu
8,505,936 B2 8/2013 Liu
8,511,694 B2 8/2013 Bradshaw et al.
8,517,399 B2 * 8/2013 Liu .......................... A61H 3/04 135/67
8,573,613 B2 * 11/2013 Liu .......................... A61H 3/04 16/20
8,602,424 B2 * 12/2013 Liu .......................... A61H 3/04 135/67
D697,163 S 1/2014 Bietsch
8,801,073 B1 8/2014 Gray, Jr. et al.
8,857,093 B2 10/2014 Hogue
8,864,151 B1 * 10/2014 Liu .......................... A61H 3/04 280/87.021
8,936,256 B2 * 1/2015 Liu .......................... A61H 3/04 135/67
9,022,397 B1 5/2015 Prettyman
9,022,413 B2 * 5/2015 Liu .......................... A61H 3/04 280/47.34
2002/0079663 A1 * 6/2002 Hallgrimsson .......... A61G 5/08 280/87.041
2002/0093178 A1 7/2002 Turner et al.
2002/0140196 A1 * 10/2002 Crouch .................... A61H 3/04 280/87.051
2003/0010368 A1 * 1/2003 MacKinnon ............. A61H 3/04 135/67
2003/0226584 A1 * 12/2003 Serhan ..................... A61H 3/00 135/74
2004/0094999 A1 5/2004 Volotsenko
2004/0111830 A1 6/2004 Cooper et al.
2005/0001398 A1 * 1/2005 Serhan ..................... A61H 3/04 280/87.01
2005/0057021 A1 3/2005 Miyoshi
2005/0121481 A1 * 6/2005 Chiu ........................ A61H 3/00 224/407
2005/1214581 6/2005 Chiu
2005/0156395 A1 7/2005 Bohn
2005/0156404 A1 7/2005 Lauren et al.
2005/0211285 A1 * 9/2005 Cowie ...................... A45B 7/00 135/74
2005/0250605 A1 11/2005 Moore et al.
2006/0156511 A1 7/2006 Li
2007/0170699 A1 7/2007 Li et al.
2007/0199586 A1 * 8/2007 Cheng ...................... A61H 3/04 135/67
2007/0227570 A1 10/2007 Gale et al.
2007/0235067 A1 10/2007 Gale et al.
2007/0267054 A1 11/2007 Meyers et al.
2007/0267453 A1 11/2007 Caroll
2007/0278271 A1 12/2007 Koren
2007/0278768 A1 12/2007 Lynam
2007/0283990 A1 * 12/2007 Fernandez ............... A61G 5/08 135/67
2008/0042476 A1 2/2008 Hei et al.
2008/0079230 A1 4/2008 Graham
2008/0111349 A1 5/2008 Willis
2008/0121258 A1 5/2008 Lin
2008/0129016 A1 6/2008 Willis
2008/0174084 A1 * 7/2008 Gee .......................... A61H 3/04 280/200
2009/0033052 A1 * 2/2009 Bradshaw ................ A61H 3/04 280/87.021
2009/0206578 A1 8/2009 Pizmony et al.
2010/0083994 A1 * 4/2010 Liu .......................... A61H 3/04 135/67
2011/0173861 A1 7/2011 Roth
2011/0187067 A1 8/2011 Staggs
2011/0241303 A1 10/2011 Campbell
2012/0043739 A1 * 2/2012 Liu .......................... A61H 3/04 280/639
2012/0104710 A1 * 5/2012 Liu .......................... A61H 3/04 280/42
2012/0133106 A1 * 5/2012 Liu .......................... A61H 3/04 280/220
2012/0205882 A1 8/2012 Staggs
2012/0280463 A1 11/2012 Liu
2012/0299272 A1 * 11/2012 Liu .......................... A61H 3/04 280/651
2013/0168947 A1 7/2013 Offord
2013/0187356 A1 * 7/2013 Hazeleger ................ A61G 5/10

(56) References Cited

U.S. PATENT DOCUMENTS

| | | | | |
|---|---|---|---|---|
| | | | | 280/250.1 |
| 2013/0264787 A1 | 10/2013 | Cheng et al. | | |
| 2013/0320640 A1* | 12/2013 | Liu | A61H 3/04 | 280/42 |
| 2014/0125037 A1 | 5/2014 | Andersen | | |
| 2014/0175841 A1* | 6/2014 | Liu | A61H 3/04 | 297/5 |
| 2014/0284891 A1* | 9/2014 | Liu | A61H 3/04 | 280/42 |
| 2014/0305249 A1* | 10/2014 | Liu | A61H 3/04 | 74/491 |
| 2014/0312586 A1 | 10/2014 | Cheng et al. | | |
| 2014/0333040 A1* | 11/2014 | Liu | A61H 3/04 | 280/42 |
| 2015/0048582 A1* | 2/2015 | Liu | B60B 33/0015 | 280/87.041 |

FOREIGN PATENT DOCUMENTS

| | | |
|---|---|---|
| CA | 2137650 | 6/1995 |
| CA | 2285305 | 10/1998 |
| CA | 2352801 | 6/2000 |
| CA | 2329485 | 6/2002 |
| CA | 2513558 | 9/2004 |
| CA | 2492392 | 9/2005 |
| DE | 1396227 | 6/1975 |
| DE | 4328875 | 2/1995 |
| DE | 29818710 | 10/1999 |
| EP | 1092411 | 4/2001 |
| EP | 2090276 | 8/2009 |
| EP | 2522404 | 11/2012 |
| GB | 23483 | 5/1913 |
| GB | 365901 | 1/1932 |
| GB | 984025 | 2/1965 |
| GB | 2180508 | 4/1987 |
| JP | 09123915 A | 5/1997 |
| JP | 10-291401 | 11/1998 |
| NL | 1022512 | 8/2004 |
| WO | WO 92/06661 | 4/1992 |
| WO | WO 98/51557 | 11/1998 |
| WO | WO 02/22070 | 3/2002 |
| WO | 2008019454 | 2/2008 |

OTHER PUBLICATIONS

A web printout screen shot of http://web.archive.org/web/20080608193327/http://www.dolomite.biz/dolomite/products.php (exhibit TT-33) dated Feb. 14, 2008.

Caster, http://en.wikipedia.org/wiki/Caster.

Merriam-Webster Dictionary, Arch—Definition and More from the Free Merriam-Webster Dictionary.

English Abstract web printout of JP9123915.

English Abstract web printout of DE4328875.

English Abstract web printout of JP10291401.

US 7,364,173, 04/2008, Meyers et al. (withdrawn).

Thelma Thibodeau, "Affidavit of Thelma Thibodeau", signed on Nov. 20, 2012, 113 pages, Montreal, Canada, listing the following: A web printout screen shot of http://doclibrary.invacare.fr/Office/Europe/Marketing/MktDocIE.nsf/MListeProduct?openform &bu=3000&subgroup=3300&family=3410 (exhibit TT-5). . . showing the words "Jazz Sales Brochure" besides a listing "May 1, 2008", which allegedly eventually links to "Dolomite Jazz Operating Instructions" shown in exhibit TT-7. . . . (http://doclibrary.invacare.fr/Office/Europe/Marketing/MktDocIE.nsf/VALLMDocument/BCCFF695FBFFA571C12 575BA0056AB70/$File/OPERATING%20INSTRUCTIONS%20JAZZ.pdf).

A web printout screen shot of http://web.archive.org/web/20080512005035/http://www.handicat.com/at-num-18827.html (exhibits TT-16, 17) dated May 12, 2008.

A web printout screen shot of http://web.archive.org/web/20080512005035/http://www.handicat.com/at-num-18827.html (translated) (exhibit TT-18) dated May 12, 2008.

A web printout screen shot of http://doclibrary.invacare.fr/Office/Europe/Marketing/MktDocCor.nsf/MListeDocument?openform &bu=3000&subgroup=3300&family=3410&product=65_JAZ . . . showing the words "TUV Certificate 2007—Jazz" (exhibit T-23).

"Pruefprotokoll/test protocol Rollatoren 07/05", signed on Oct. 30, 2007 (exhibit TT-25), Hannover, Germany.

A web printout screen shot of http://web.archive.org/web/20080214151414/http://www.dolomite.biz/(exhibit TT-32) dated Feb. 14, 2008.

A web screen shot prinout from doclibrary.invacare.fr . . . (?) dated Aug. 6, 2013, in which adjacent to the heading "Dolomite Jazz", a "Jazz Sales Brochure" is listed as. . . having a "start date of validity" of May 1, 2008, and in which a "Jazz spare parts list" is listed as having a "start date of validity" of May 1, 2008.

Two web screen shot prinouts from doclibrary.invacare.fr . . . (?) dated Aug. 6, 2013, in which adjacent to a "Dolomite Jazz" heading, "2007" is set out by a "TUV certificate".

Two web screen shot prinouts from handicat.com/classif4-num-03-09-06.html, dated Aug. 6, 2013, in which adjacent to a "Dolomite Jazz" heading, the words "Crée le. . . May 7, 2008—Modifiée: Jul. 24, 2013", which may mean "Created on May 7, 2008—Modified; Jul. 27, 2013".

A web screen shot printout of web.archive.org/web/20080508194602/http://www.dolomite.biz/, dated May 8, 2008.

* cited by examiner

FOLDABLE WALKER APPARATUS

CROSS REFERENCE TO RELATED APPLICATION

This application is a divisional of U.S. patent application Ser. No. 13/270,440 filed in the United States Patent and Trademark Office on Oct. 11, 2011, which is a divisional of U.S. patent application Ser. No. 12/247,781 filed in the United States Patent and Trademark Office on Oct. 8, 2008, the disclosures of which are incorporated herein by reference and priority to which is claimed.

BACKGROUND OF THE INVENTION

1. Field of the Invention

The present invention relates to a foldable walker apparatus. More particularly, it relates to a foldable walker apparatus having a variety of optimized features relating to its folding mechanism, braking pad mechanism and brake housing, brake rod assembly, frame shape and collapsible basket.

2. Description of the Related Art

It is known to have foldable walkers. However, much of the prior art discloses walkers that require many parts and this may lead to additional manufacturing costs. On the other hand, some walkers have fewer parts but may suffer from a lack of robustness and rigidity, particularly in the lateral direction. This may lead to a compromise in the safety of such devices. Some walkers in their folded states remain bulky and difficult to manage. Still further known walkers suffer from having many parts that may tangle with one's clothing.

There are a great variety of frame shapes for walkers. In order to accommodate the variety of body shapes and circumstances that a user of walkers may encounter, a strong frame is needed. This has led to frames that have many parts, which may lead to further manufacturing costs. Alternatively, this has led to frames that are square or rounded-square in profile which are thicker and/or made of heavy duty metals. Such features may lead to a heavier, less manageable and therefore less enjoyable walker.

Many foldable walkers include baskets. However oftentimes these baskets need to be removed before the foldable walkers may be folded. Alternatively, many of these baskets require the foldable walker to fold from front to back. This may compromise the strength and rigidity of the frame of the foldable walker. Also, many of the baskets for walkers require many parts. This may act to increase manufacturing costs.

A variety of walkers have a housing over the brake pad mechanisms. However oftentimes this housing only partially extends over the brake pad. Even if the brake pad is covered by a housing, often the connecting and adjusting means for adjusting the brake pad protrudes outwards or is exposed for the user to adjust. As a result, some walkers of the prior art have brake pad mechanisms that are more prone to getting entangled with the user of the walker, which may lead to a great inconvenience and a safety concern for the user. Moreover, such walkers are more prone to breaking, and wear and tear, including damage such as thread-stripping of the connecting and adjusting means for the brake pad. This may lead to the considerable inconvenience, and extra expense to the user, or a premature need to replace the brake pad mechanism. It may also lead to a further compromised safety to the user if as a result the walker no longer brakes.

The use of a brake rod for walkers is known. Brake rods provide the advantage of enabling the walker's height to be adjusted without affecting brake cables disposed within the walker's telescoping tubes. However, some walkers require the two separate steps of 1) adjusting and fixing the height of the telescoping tubes through thumb screws and 2) fixing the brake rod to function accordingly. This is time consuming, requiring additional parts and thus manufacturing costs. It also may require a significant degree of dexterity which may therefore be challenging and therefore frustrating for the user of the walker. Some walkers combine the fixing of the height of the telescoping tubes with the fixing of the brake rods. However such walkers require that the length of the telescoping tubes be first fixed by the user in order to enable the brake rods to function. Therefore, if the user does not have the dexterity to fix the height of the telescoping tubes, or if the fixing mechanism for the telescoping tubes malfunctions or no longer works through damage or wear and tear, such as a stripping of the thumb screw, this means that the brake rod cannot be fixed and the braking function of the walker will not work. This may result in a walker braking mechanism that is less robust and less safe.

BRIEF SUMMARY OF INVENTION

An object of the present invention is to provide an improved walker apparatus that overcomes the above disadvantages.

More particularly, the present invention provides a walker apparatus with a folding mechanism that allows the walker to be folded laterally in a compact manner, and that minimizes the number of required parts while optimizing robustness and lateral support. A frame shape is provided with enhanced strength-to-weight and strength-to-number-of-parts ratios, as well as enhanced stability for the walker apparatus. A collapsible basket is provided that simply collapses laterally in conjunction with the walker, that is readily removable and that requires fewer parts. A brake housing is provided that more fully encloses and therefore protects the brake pad mechanism, including the means for connecting and adjusting the brake pad, which thereby provides a more streamline, more robust and safer walker apparatus. A brake rod is provided that is self-adjusting and thereby provides a more robust, user-friendly and safe walker apparatus.

According to one aspect of the invention, there is a provided a collapsible walker. The walker includes a pair of spaced-apart support members that are arc-shaped. The support members each have a proximal end, a distal end spaced-apart from its proximal end and an apex interposed between its proximal and distal ends. The walker includes a pair of elongate rods. Each rod extends from the distal end towards the proximal end of a respective one of the support members. The walker includes a seat extending between and connecting to the apexes of the support members. The walker includes a basket having a pair of spaced-apart ends members operatively connected to and extending between the support members. The end members are positioned adjacent to the distal ends of the support members. Each end member operatively connects to both a respective one of the rods and a respective one of the support members. The walker includes a pair of connection brackets for connecting the end members to the walker. Each connection bracket extends from a respective one of the support members to a respective one of the rods.

According to another aspect, there is a provided a collapsible walker. The walker includes a pair of spaced-apart, arc-shaped support members. Each support member has a proximal end, a distal end and an apex spaced therebetween. Respective rods extend from the distal ends towards the proximal ends of the support members. A seat extends between and connects to the apexes of the support members. A basket with a pair of spaced-apart ends members operatively connects to and extends between the support members. The end members are positioned adjacent to the distal ends of the support members. Each end member operatively connects to both a respective one of the rods and a respective one of the support members. The walker includes a pair of connection brackets for connecting the end members to the walker. Each connection bracket extends from a respective one of the support members to a respective one of the rods.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
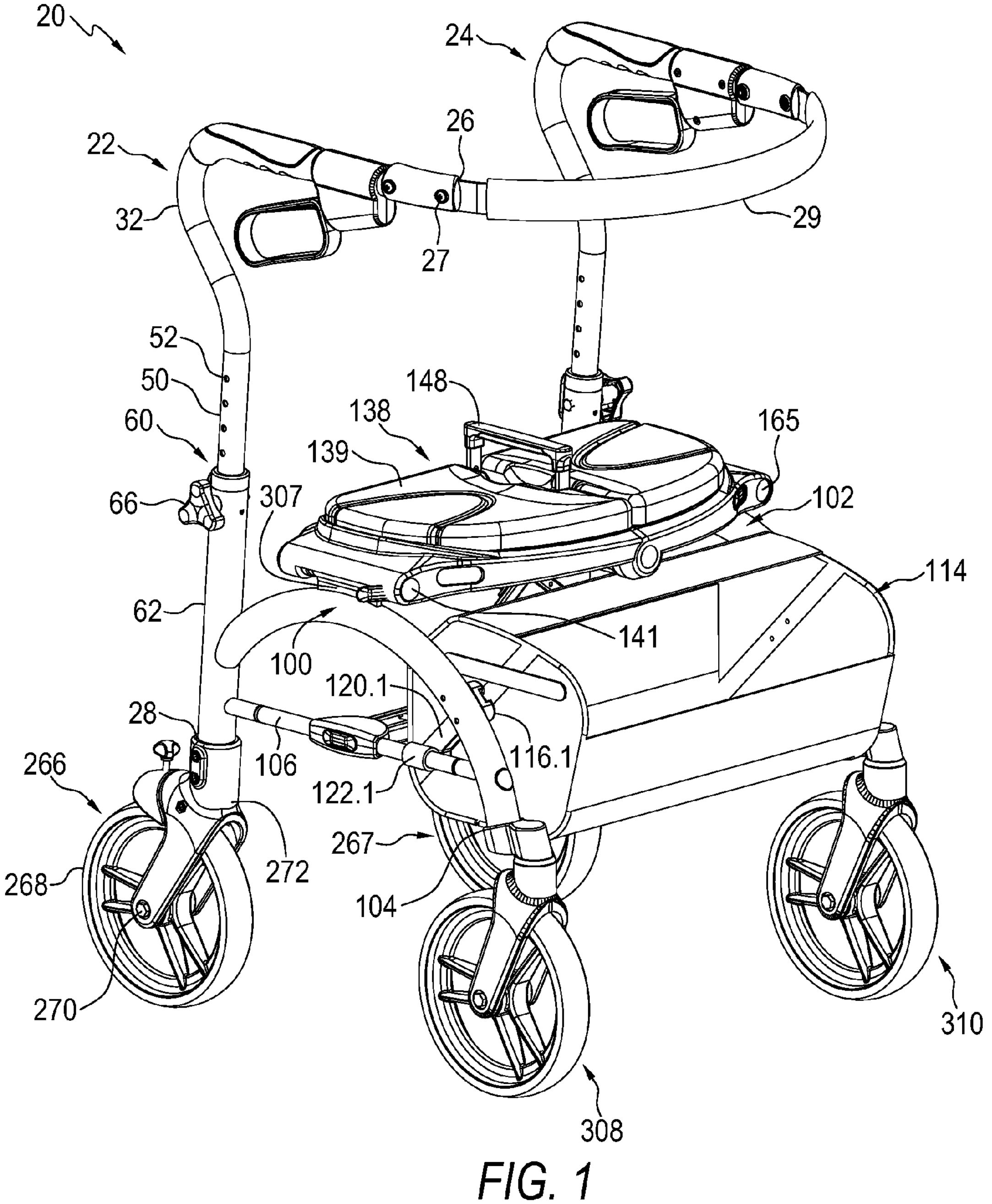
FIG. 1 is a top, front isometric view of a walker apparatus, according to one embodiment of the invention.

Referring to the drawings and first to FIGS. 1 to 4, there is provided a walker apparatus in this example a foldable walker apparatus 20. The walker apparatus 20 includes a pair of upright, spaced-apart elongate members or outer frame members 22 and 24. As shown in FIG. 1, outer frame member 22 has an upper end 26 and a lower end 28 spaced-apart therefrom. A screw 27 located adjacent to the upper end connects to a backrest member 29. The same applies for outer frame member 24 and the backrest member 29 thereby connects the outer frame members 22 and 24 together at their upper ends. Each of the outer frame members has substantially the same parts and performs substantially the same functions and therefore only outer frame member 22 will be discussed in detail.

Figure 5:
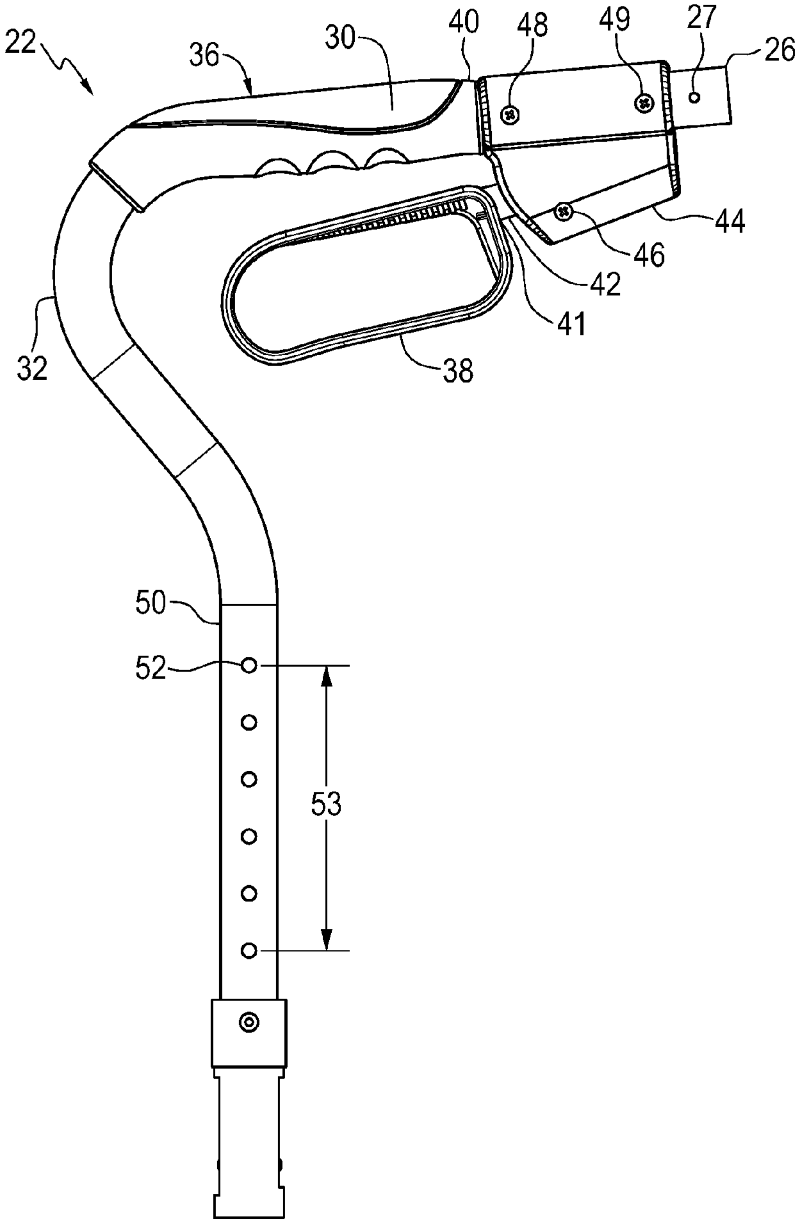
FIG. 5 is a side elevation view of part of an outer frame member including a handle bar assembly, according to one embodiment of the invention.

FIG. 5 shows part of the outer frame member 22 including a straight portion 40 with a handle bar assembly 36 extending outwards therefrom adjacent the upper end 26. The handle bar assembly 36 includes a grip pad 30 extending along the straight portion 40. The handle bar assembly 36 includes a handle bar housing 44 comprised of two halves secured together and secured to the straight portion 40 via screws 46, 48 and 49. The handle bar assembly 36 also includes a first handle lever 42 having a first end 41 with an actuator, in this example a braking or gripping handle 38, extending therefrom. The handle bar assembly 36 is illustrated in greater detail in FIGS. 7 to 9 where one half of the handle bar housing 44 is partially removed to show an interior 45 of the handle bar housing 44.

Figure 7:
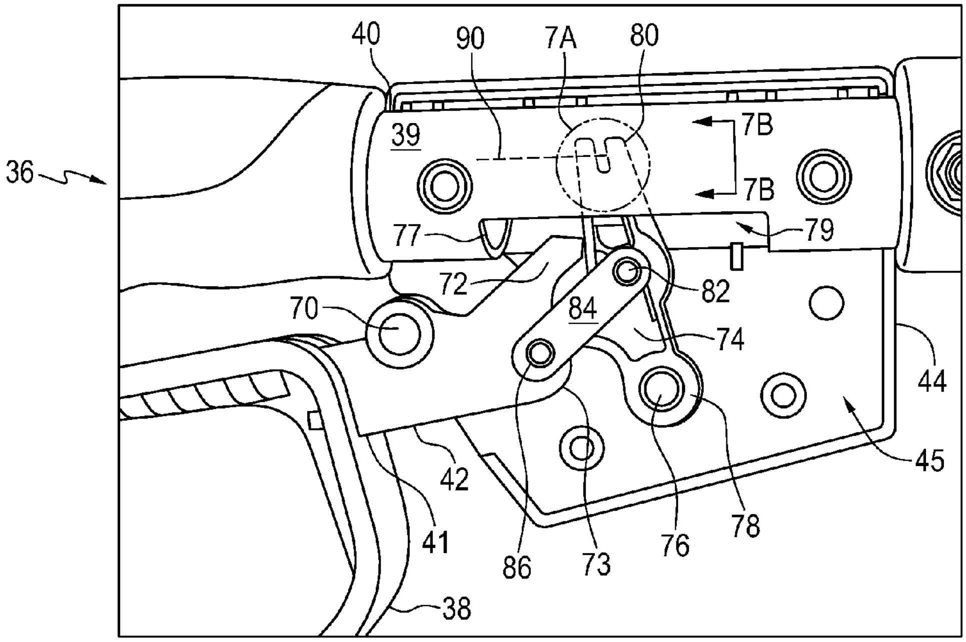
FIG. 7 is a partial, side elevation view of the interior of the handle bar assembly including a handle in a non-actuated mode.

Referring first to FIG. 7, this shows the handle bar assembly in an non-actuation mode. The first handle lever 42 is pivotally mounted via pivot 70 to the handle bar housing 44. The first handle lever 42 has a second end 72 spaced-apart from the first end 41. The first handle lever 42 includes a projection 73 interposed between the first end 41 and the second end 72. The second end 72 is positioned to be engageable a second handle lever 74.

The second handle lever 74 is pivotally mounted to the handle bar housing 44 via pivot 76 at a first end 78 of the second handle lever 74. The second handle lever 74 has a second end 80 spaced-apart from the first end 78. A link 84 pivotally connects together the first handle lever 42 to the second handle lever 74 via pivot 86 which is between ends 41 and 72 of the first handle lever, and pivot 82 which is between ends 78 and 80 of the second handle lever. The first handle lever 42, the second brake lever 74 and the link 84 so configured and connected to the housing may collectively be referred to as an actuation means for actuating a connection member or brake wire 90 when the gripping handle 38 is squeezed. As shown in FIG. 7C, the second handle lever 74 has a projection 75 between the first end 78 and the second end 80 that extends towards the projection 73 of the first handle lever 42. These are shown in FIG. 7C with the link 84 removed. Referring FIG. 7, the second end 80 of the second handle lever 74 extends within and is moveable within a recess 79 of a body 39 of the straight portion 40 of the outer frame member. An edge 77 is interposed between the body 39 and recess 79.

Figure 7A:
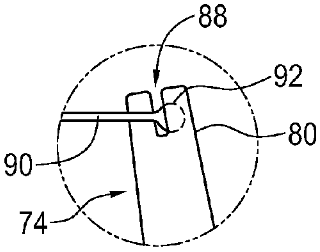
FIG. 7A is an enlarged up, side elevation view of a lever and brake wire connected thereto for the handle bar assembly of FIG. 7.
Figure 7B:
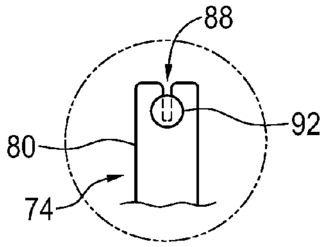
FIG. 7B is an enlarged view along lines 7B-7B of FIG. 7 illustrating the lever and brake wire connected thereto.
Figure 7C:
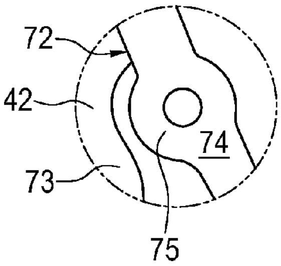
FIG. 7C is an enlarged, partial view of FIG. 7 showing a projection from a first handle lever and an adjacent projection from a second handle lever.

Referring to FIGS. 7A and 7B which show partially within the recess 79, the second end 80 includes a slot 88. The brake wire 90 is connected to the second handle lever 74 through a nipple 92 extending from the brake wire 90 and that slidably engages with the slot 88.

Figure 8:
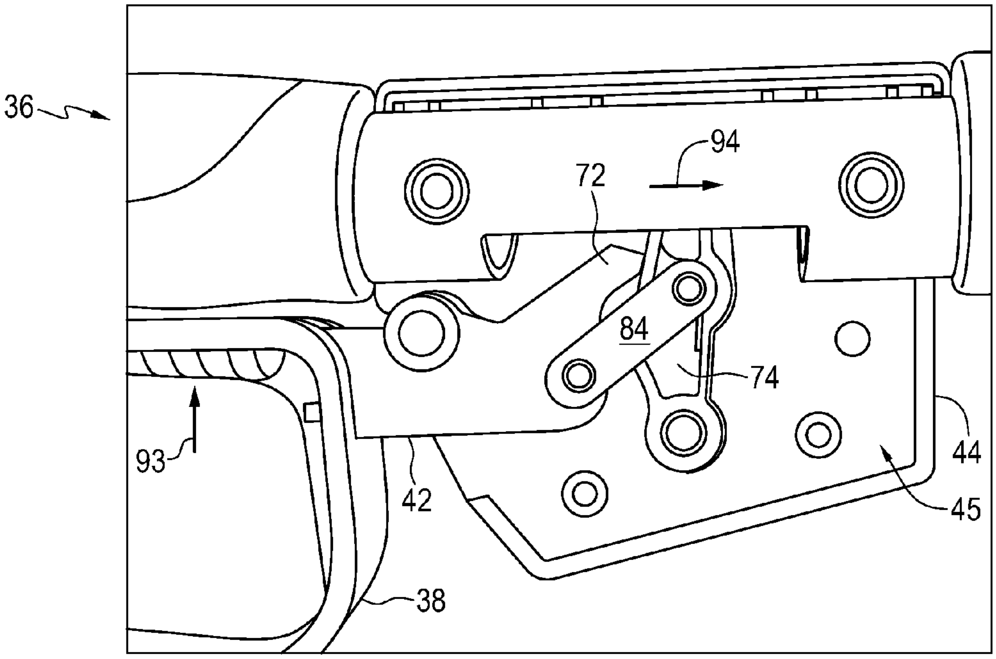
FIG. 8 is a partial, side elevation view similar to FIG. 7 with the handle is an actuated brake mode.

The handle bar assembly 36 may be positioned in an actuated, braking mode as shown in FIG. 8. When the gripping handle 38 is actuated or pulled upwards from the perspective of FIG. 8 as indicated by arrow 93, this causes the second end 72 of the first handle lever 42 to forceably abut against and push the second handle lever 74 to the right, from the perspective of FIG. 8 as indicated by arrow 94. This thereby causes the brake wire 90 to be actuated.

Figure 9:
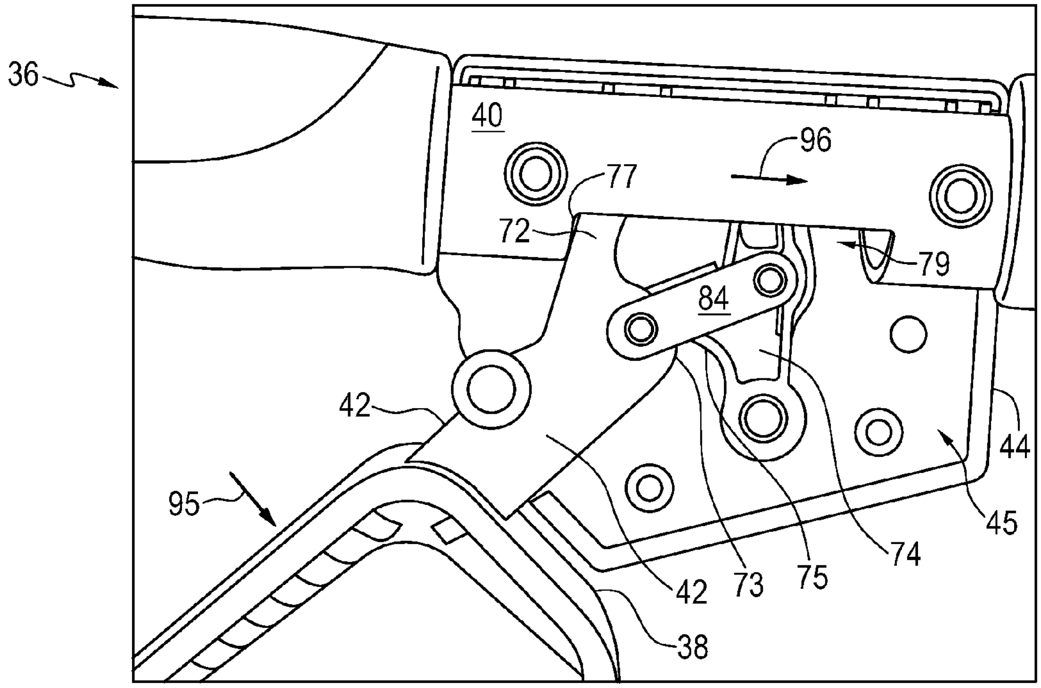
FIG. 9 is a partial, side elevation view similar to FIG. 7 with the handle is an actuated park mode.

The handle bar assembly 36 may be positioned in an actuated, parking mode as shown in FIG. 9. When the gripping handle is actuated or pushed downward from the perspective of FIG. 9, this causes the first end 72 of the first handle lever 42 to move within the recess 79 and abut against edge 77. Also, the projection 73 of the first handle lever 42 is caused to forcibly abut with the projection 75 of the second handle lever 74. The first handle lever 42 is thereby held in place by being wedged between the edge 77 of the straight portion 40 and the projection 75. The abutment of the projection 73 against projection 75 thereby causes the second handle lever 74 to move to the right from the perspective of FIG. 9 as indicated by arrow 96 and thereby actuate the brake wire 90.

Figure 6:
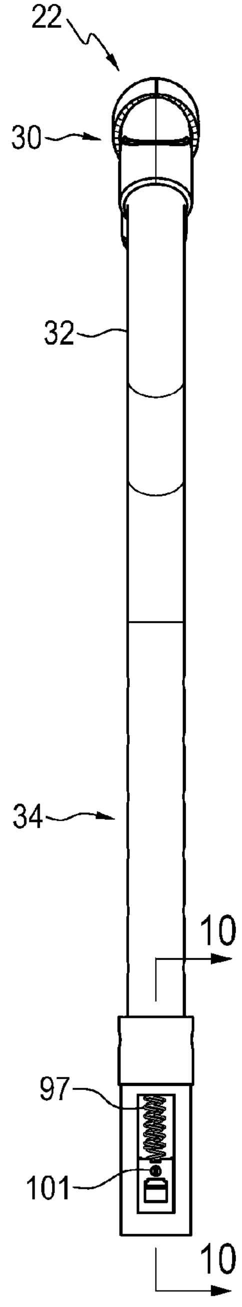
FIG. 6 is a rear elevation view of the part of the outer frame member of FIG. 5.

Referring back to FIGS. 5 and 6, the frame member 22 has a bend 32 extending from the straight portion 40. Referring to both FIG. 1 and FIG. 5, the bend 32 extends to telescoping tubes 60 which include inner tube 50 and outer tube 62 shaped to receive the inner tube 50. The straight portion 40, the bend 32 and telescoping tubes 60 together provide a rounded L-shape for the outer frame member 22. Tube 50 has a plurality of spaced-apart apertures 52 which define an adjustment range 53, as shown in FIG. 5. A means for locking the telescoping tubes together, in this example a thumb screw 66, shown in FIG. 1, may be inserted through one of said apertures to fixedly adjust the height of the telescoping tubes 60, as is well known to those skilled in the art. This thereby enables the height of the walker apparatus to be adjusted to provide an optimized height for the user.

Figure 10:
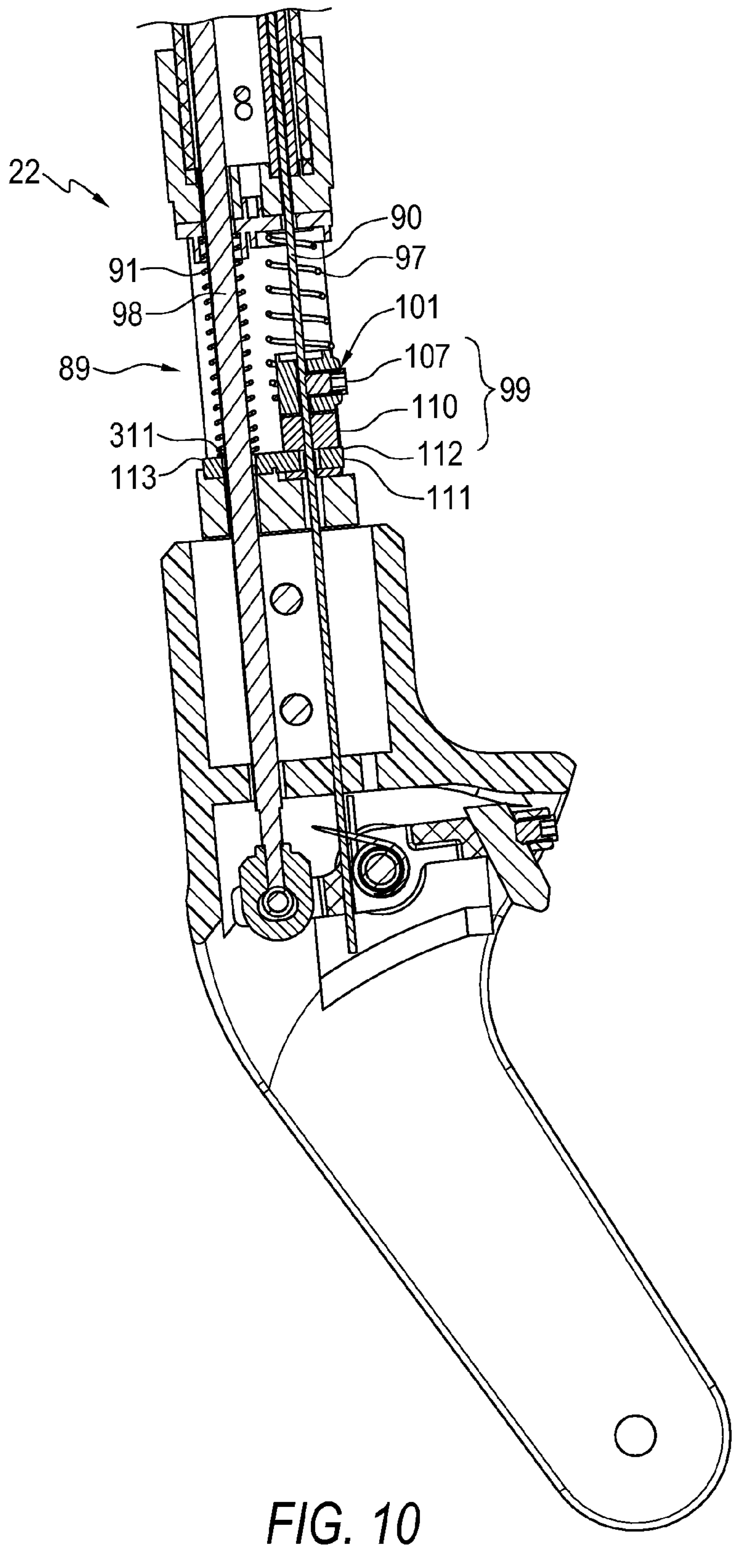
FIG. 10 is a side partial view of the outer frame member in section along lines 10-10 of FIG. 6 to illustrate a brake rod assembly according to one embodiment of the invention.

FIG. 10 shows part of the outer frame member 22 partially in section to reveal a brake rod assembly 89. The brake rod assembly 89 includes an actuating member, in this example a brake rod 98 which extends within inner tube 50 of FIG. 5. The brake rod 98 in this example has a hexagonal cross-section. A coil spring 91 extends about the brake rod 98. A gripping member 99 is adjacent to and is slidably engageable with the brake rod 98 along a distance equal to the adjustment range 53 of FIG. 5. The gripping member 99 in this example includes a clamp 101 that engages with the brake wire 90 via a set screw 107. A coil spring 97 wraps around brake wire 90 above the clamp 101 from the perspective of FIG. 10. The coil spring 91 and the coil spring 97 bias the gripping member 99 downwards, from the perspective of FIG. 10, towards a non-actuated mode. The gripping member 99 also includes a block 110 and plate 112, in this example a metal plate, that both also engage with the brake wire 90 near a first end 111 of the metal plate. The metal plate 112 has an aperture 311 near a second end 113 of the metal plate spaced-apart from the first end 111. The brake rod 98 passes through the aperture 311. The metal plate 112 is slidably engageable with the brake rod 98.

Figure 11:
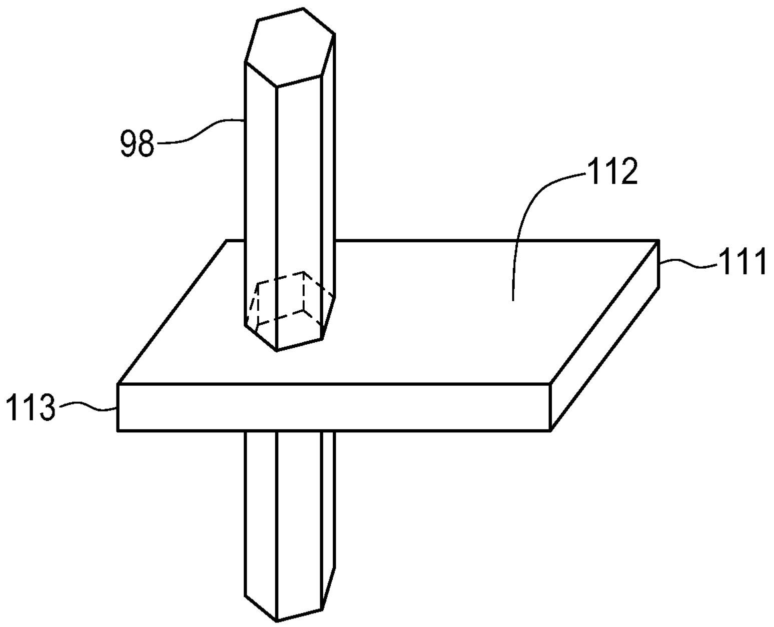
FIG. 11 is an enlarged, partial elevation view of the brake rod with a gripping member according to one embodiment of the invention slidably connected thereto in a non-actuated mode.
Figure 12:
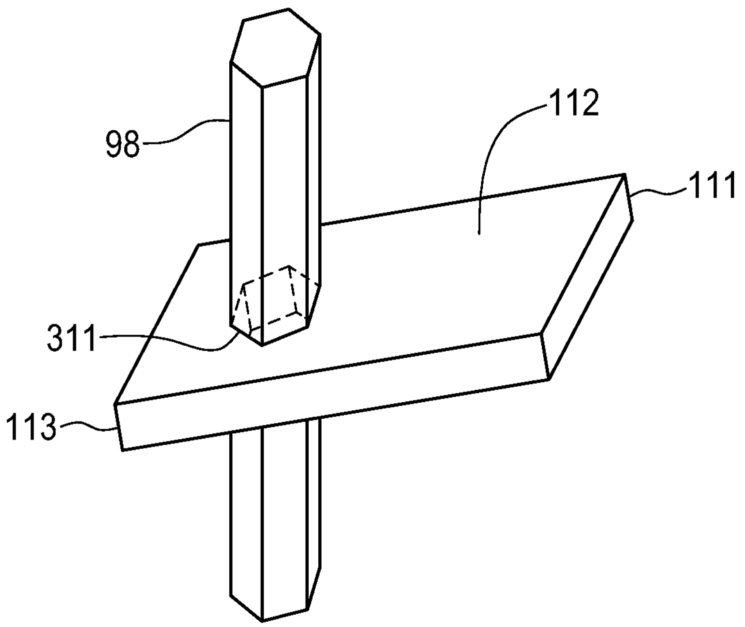
FIG. 12 is an enlarged, partial elevation view similar to FIG. 11 with the gripping member engaging the brake rod in an actuated mode.

FIG. 11 shows the metal plate 112 and the brake rod 98 of FIG. 10 in isolation. The metal plate 112 slidably receives the brake rod 98 in a non-actuated mode. The brake wire 90 is operatively connected adjacent to the first end 111 as seen in FIG. 10. When the brake wire 90 is actuated or pulled upwards from the perspective of FIGS. 10 and 11, the first end 111 of the metal plate moves upward as indicated by FIG. 12. The plate is thereby caused to tilt, with the aperture 311 abutting and engaging the brake rod 98. The metal plate 112 thereby is able to grip the brake rod 98. The brake wire 90 continues to be pulled upwards when actuated and this causes the metal plate, and in turn, the brake rod 98, to move upwards in unison with the brake wire 90.

Referring back to FIG. 1, a first pair of wheel assemblies 266 and 267 are rotatably mounted to the outer frame members 22 and 24. In this example both wheel assembly 266 and wheel assembly 267 are structurally and functionally the same. Accordingly, only wheel assembly 266 will be discussed in detail.

Figure 13:
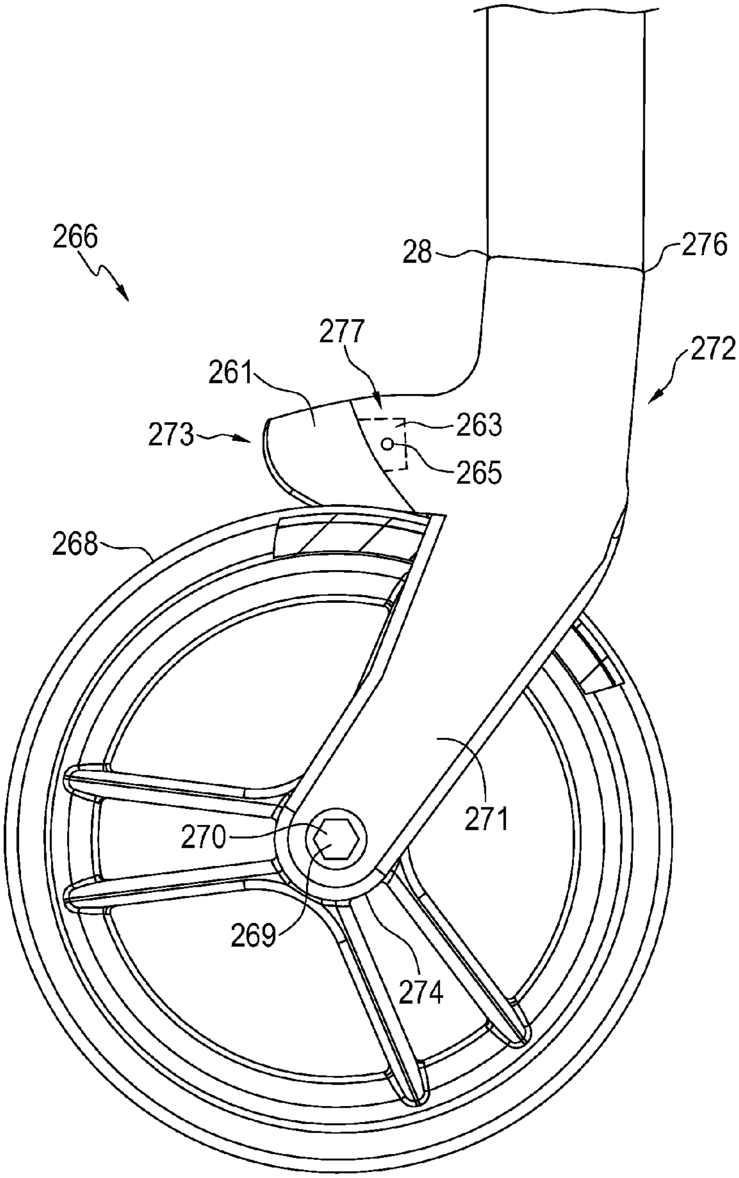
FIG. 13 is a side elevation view of a wheel assembly illustrating a brake housing according to one embodiment of the invention.
Figure 14:
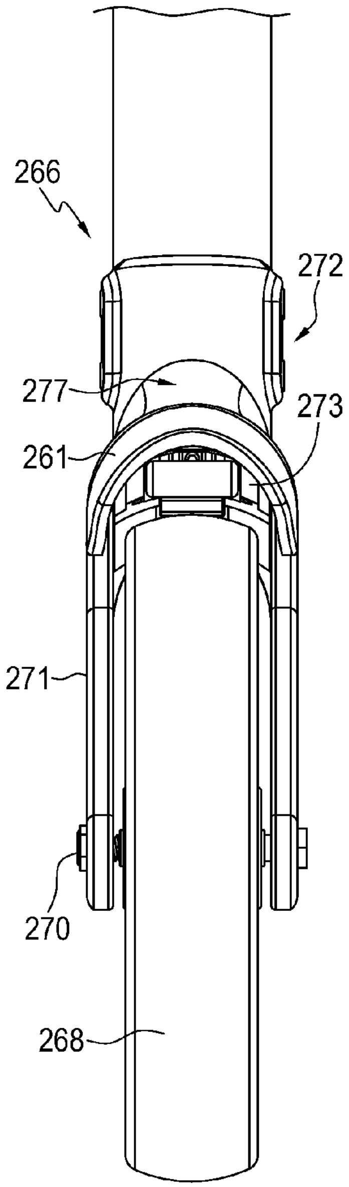
FIG. 14 is a rear elevation view of the wheel assembly and brake housing.

Referring to FIGS. 13 and 14, the wheel assembly 266 includes a brake pad assembly 272. The brake pad assembly 272 has a proximal end 276 that connects to the lower end 28 of the outer frame member 22. The brake pad assembly 272 has a bracket housing 271 that receives a ground-engaging wheel 268 at a distal end 274 of the brake pad assembly which is spaced-apart from the proximal end 276. An aperture 270 near the distal end 274 connects to the wheel 268 via a wheel axis 269. The brake pad assembly 272 includes an arch-shaped brake housing 277, as seen in FIGS. 13 and 14, between the proximal end 276 and the distal end 274. The brake housing 277 extends overtop of and along at least a portion of the wheel 268 and includes an interior 273. The brake housing 277 includes a removable covering portion 261 that has an inner portion 263 within the interior 273 and which connects to the rest of the brake housing by means of a screw 265 which his Allen key removable in this example.

Figure 15:
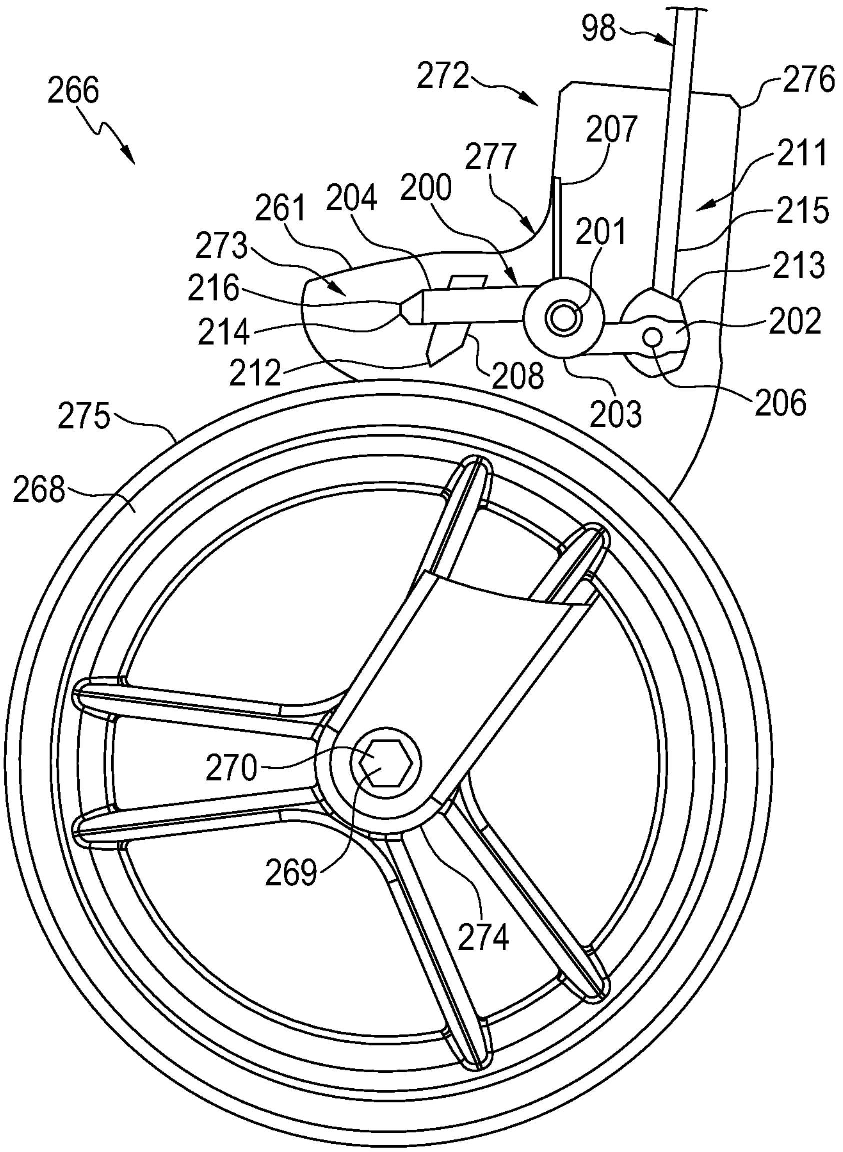
FIG. 15 is a side elevation view similar to FIG. 13 with the brake housing partially in section to illustrate a brake pad assembly in a non-actuated mode.
Figure 16:
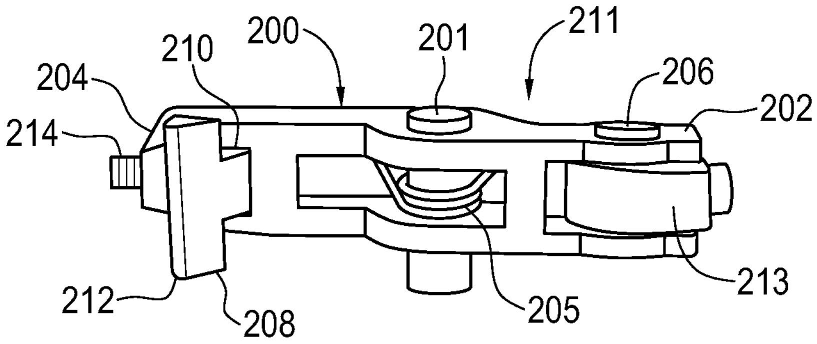
FIG. 16 is bottom plan view of the brake pad assembly of FIG. 15.

FIG. 15 shows the wheel assembly 266 with the brake housing 277 partially removed to show the interior 273. The brake pad assembly 272 includes a brake pad mechanism 211 located within the interior 273. As seen in FIGS. 13 to 15, the arch-shaped brake housing 277 extends completely overtop of the brake pad mechanism. The brake pad mechanism 211 includes a brake pad lever 200 pivotally mounted to the brake housing 277 via pivot rod 201 as best shown in FIG. 16.

Figure 17:
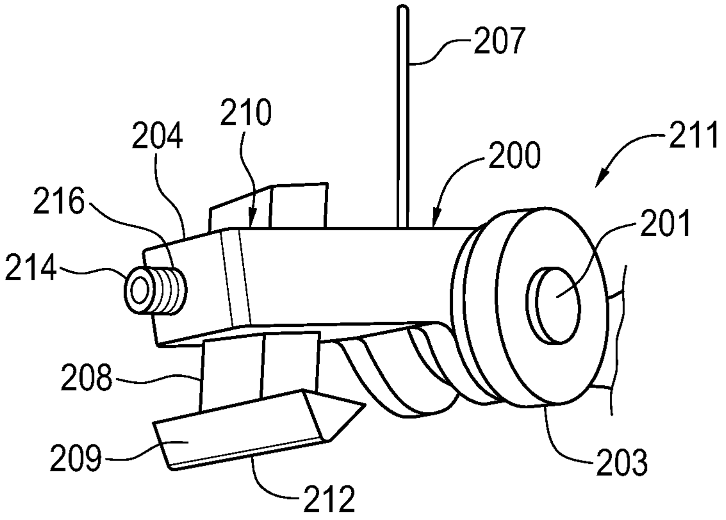
FIG. 17 is a rear perspective view of the brake pad assembly of FIG. 16 illustrating a brake pad and a means for fixing and adjusting the brake pad.

Bushings 203 on both ends of the pivot rod 201 are interposed between the brake pad lever 200 and the brake housing 277. A spring 205 is coiled around the pivot rod 201 and, as shown in FIG. 17, includes an outer portion 207 that extends outwardly away from the brake pad lever 200. The brake pad lever 200 has a first end 202 with a pivot 213 that connects to the brake rod 98. As seen in FIG. 15, the brake housing 277 extends about and covers a lower portion 215 of the brake rod. The brake pad lever 200 also has a second end 204 which is opposite the first end 202.

Figure 18:
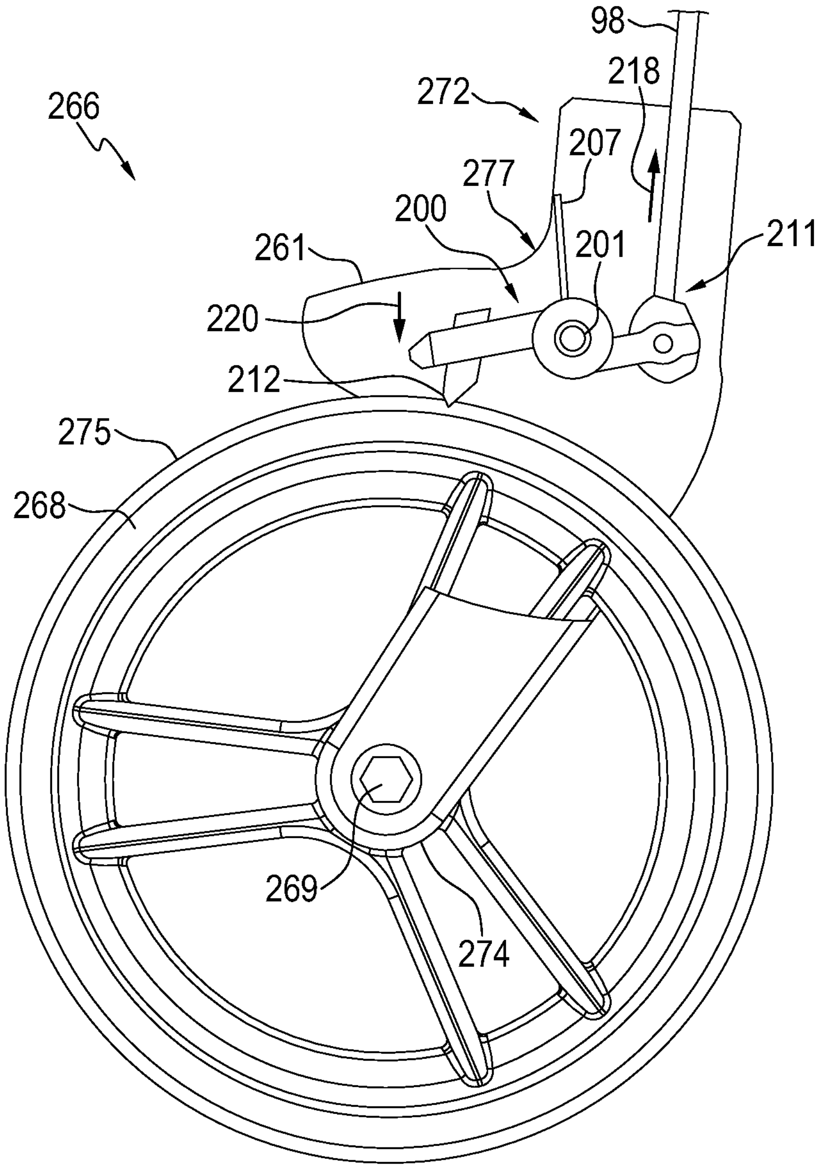
FIG. 18 is a side elevation view similar to FIG. 15 illustrating the brake pad assembly in an actuated mode with the brake pad engaging the wheel.
Figure 19:
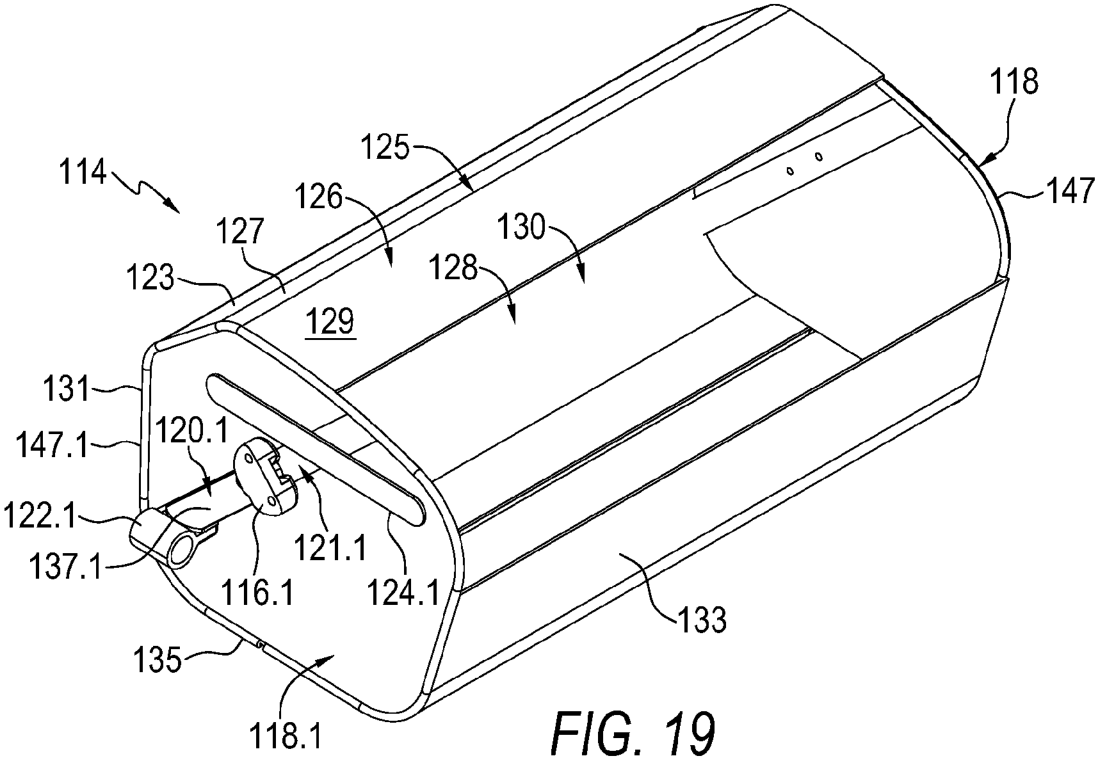
FIG. 19 is a top, front isometric view of a collapsible basket according to one embodiment of the invention.
Figure 20:
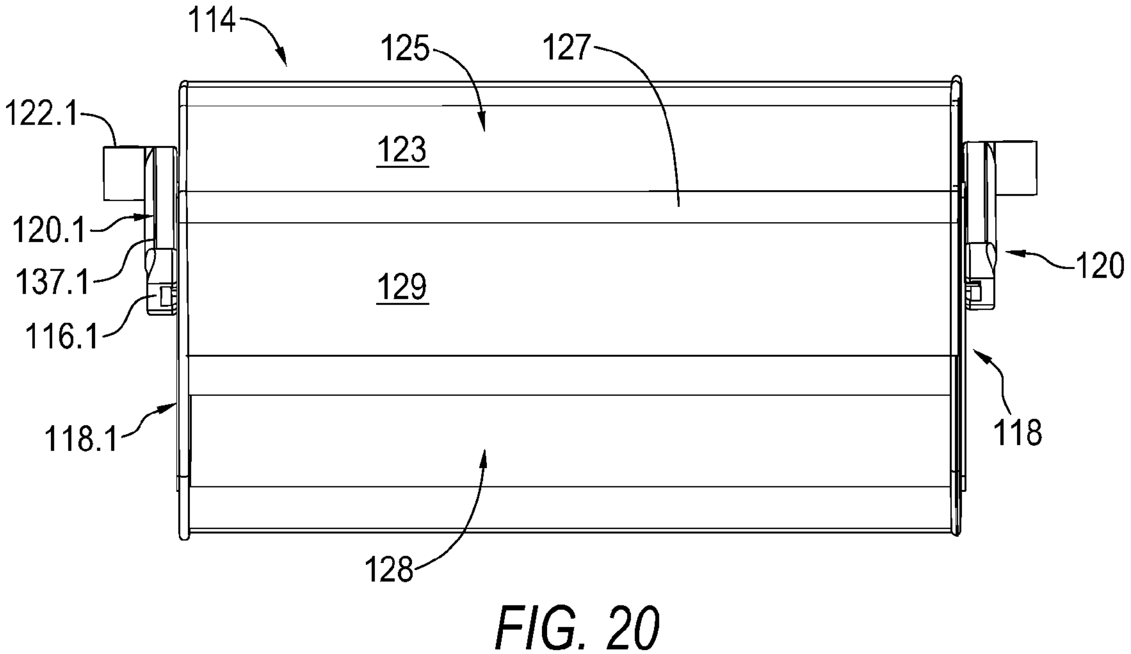
FIG. 20 is a top plan view of the collapsible basket of FIG. 19.

A brake pad 212 is located near the second end 204. As best shown in FIG. 17, it includes an elongate part 208 that is slidably insertable within a slot 210. The brake pad 212 extends outwards from the slot 210 towards an outer periphery 275 of the wheel 268 shown in FIG. 18. The brake pad 212 includes a contact part 209 extending parallel to the wheel axis 269 shown in FIG. 15 for engaging the wheel 268. The brake pad 212 as a result is T-shaped in this example.

The brake pad mechanism 211 includes a means 214 for connecting the brake pad 212 within the slot 210 and for adjusting the position of the brake pad 212 relative to the wheel 268. The means 214 for connecting and adjusting is located at the second end 204 of the brake pad lever 200, as best shown in FIG. 17. In this example, the means for connecting and adjusting 214 is an Allen key adjustable screw that passes through aperture 216 to releasably abut the elongate part 208 of the brake pad 212. Referring to FIG. 15, the covering portion 261 is adjacent to the means 214 for connecting and adjusting. The brake housing 277 extends around the brake pad mechanism 211, including the means 214 for connecting and adjusting, to at least the outer periphery 275 of the wheel 268 for fully protecting the brake pad mechanism 211 thereby. Advantageously, the means 214 for connecting and adjusting is accessible upon removal of the covering portion 261.

The brake pad lever 200 is spring-biased via the outer portion 207 of the spring 205, which abuts against the brake housing 277 as shown in FIG. 15, to position the brake pad 212 spaced-apart from and adjacent to the outer periphery 275 of the wheel 268.

In operation, to brake the walker apparatus, the braking handle is either pulled upwards in the direction of arrow 93 for braking as shown FIG. 8 or pushed downwards for parking as shown in FIG. 9. Either of these actions operatively actuates the brake wire 90, which in turn actuates the gripping member 99 to engage or actuate the brake rod 98, as shown in FIG. 12. When brake rod 98 is actuated or moved upward from the perspective of FIG. 18, the brake pad lever 200 causes the brake pad 212 to engage the wheel 268 for inhibiting rotation of the wheel.

Referring back to FIG. 1, the walker apparatus 20 has a second pair of ground-engaging wheel assemblies 308 and 310. These wheel assemblies 308 and 310 are similar to wheel assemblies 266 and 267 with the exception that they do not include brake pad assemblies or mechanisms.

Figure 3:
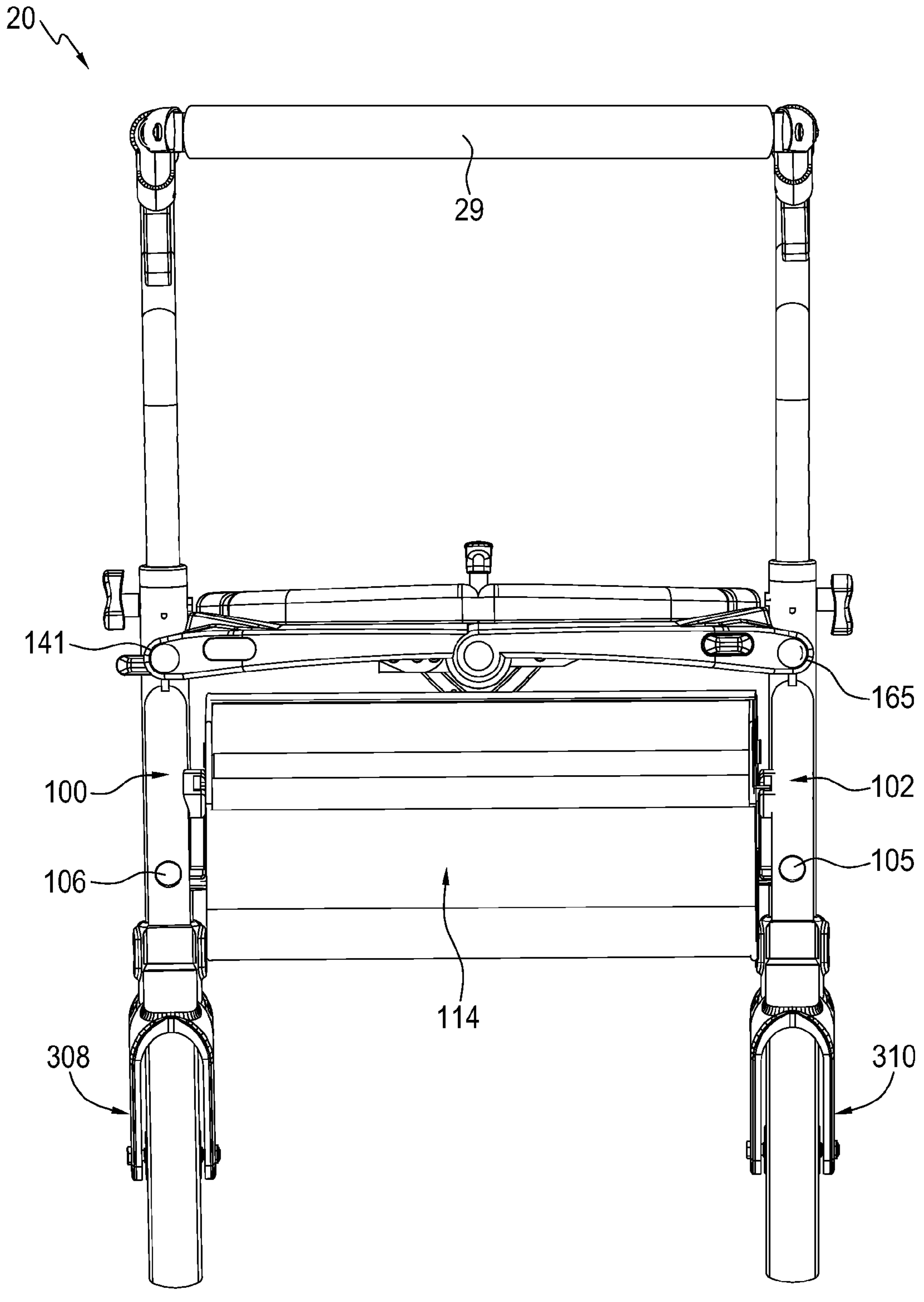
FIG. 3 is a front elevation view of the walker apparatus of FIG. 1.
Figure 4:
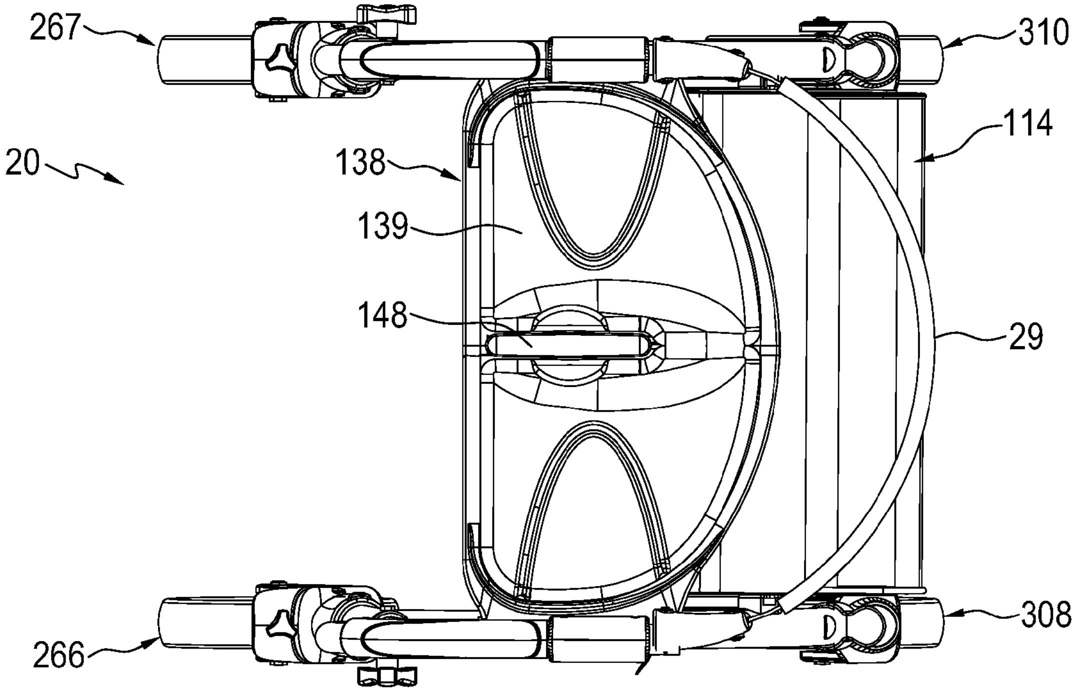
FIG. 4 is a top plan view of the walker apparatus of FIG. 1.

A pair of spaced-apart support members 100 and 102 connect together the first and second pair of wheel assemblies, as best shown in FIGS. 1 and 3. Each support member is the substantially the same and has the same structure and function. Only support member 100 will be discussed in detail. Support member 100 aligns with and extends from the tube 62 of the outer frame member 22 to a distal end 104 of the support member which connects to wheel assembly 308. The support member 100 is arc-shaped, in this example c-shaped and partially circular, continuously curved and upwardly convex, as seen in FIG. 1. The support member 100 has an apex 307. The apex 307 is the most elevated point of the support member 100 from the perspective of FIG. 1. The apex extends towards the upper end 26 of the elongate member 22. A seat 139 for resting, which includes an extendable and retractable seat handle 148, connects to the apexes of the support members. The support members thereby support the seat 139. As shown in FIG. 1, each support member has a constant curvature in this example and extends downwardly from both sides of the seat, with the curvature of the support members forward of the seat being equal to the curvature of the supports rearward of the seat. A rod 106 extends from the tube 62 of the outer frame member 22 to near the distal end 104 of the support member 100. The same applies with respect to rod 105 for corresponding support member 102 as partially shown for example in FIG. 3. Thus, as seen in FIG. 1, the walker apparatus may be said to have a pair of seat mounts, each comprising a support member and rod, the seat mounts being d-shaped.

The foldable walker apparatus includes a collapsible basket 114 that extends between the support members 100 and 102. The collapsible basket 114 is best shown in FIGS. 19 to 22. The collapsible basket 114 includes a basket member 125 made in this example of flexible fabric. The term fabric is used in the broadest sense of the word, and may include non-woven material, plastic, flexible sheets and other such materials. The basket member 125 in this example has a top 126 with abutting faces 123, 127 and 129. The top 126 has an opening 128 for inserting objects into an interior 130 of the basket member. The basket member 125 includes sides 131 and 133 that extend downwards from the top 126 from the perspective of FIG. 19. The sides 131 and 133 in this example are made of netting. A bottom 135 opposite the top 126 connects the sides 131 and 133. The bottom 135 in this example is made of continuous, non-netted fabric.

The collapsible basket 114 includes spaced-apart end members 118 and 118.1. Each end member, such as end member 118, is flat and includes a rigid peripheral portion which in this example is a wire loop in this example 5-sided wire frame 147. The basket member 125 extends between and is supported by the wire frame of the end members. The end members are moveable towards each other when the walker apparatus is folded due to the flexibility of the basket member 125. The basket member may thereby fold to collapse the collapsible basket 114 when folding the walker apparatus. Importantly, this is possible without needing to remove the collapsible basket 114 from the walker apparatus.

Figure 22:
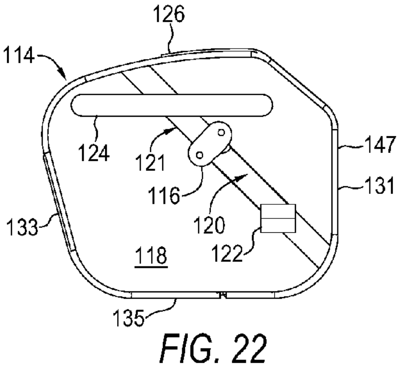
FIG. 22 is side elevation view of the collapsible basket of FIG. 19.

Each of the end members is substantially the same with the same structure and function. Generally only end member 118 will be discussed in detail with like parts of end member 118.1 having like numbers and the additional designation "0.1". As shown in FIG. 22, end member 118 in this example includes an insert 121 which diagonally extends from the top 126 to the side 131. The end member 118 may include a flap member 124 to further secure the insert 121 to the end member 118. The insert 121 includes an extended grooved projection 117 as best shown in FIG. 21A.

A connection bracket 120 is shaped through a grooved housing 137 to slidably receive the grooved projection 117. The groove housing 121 is best shown in FIG. 21A, which shows the connection bracket 120 partially in section. Referring back to both FIG. 19 and FIG. 1, each connection bracket in this example connection bracket 120.1 includes a first connector 116.1 which fastens the connection bracket 120.1 to the support member 100 near the distal end 104 of the support member 100. The connection bracket 120.1 includes a second connector 122.1 spaced-apart from the first connector 116.1 by the grooved housing 137.1. The second connector 122.1 fastens the connection bracket 120.1 to the rod 106.

Figure 2:
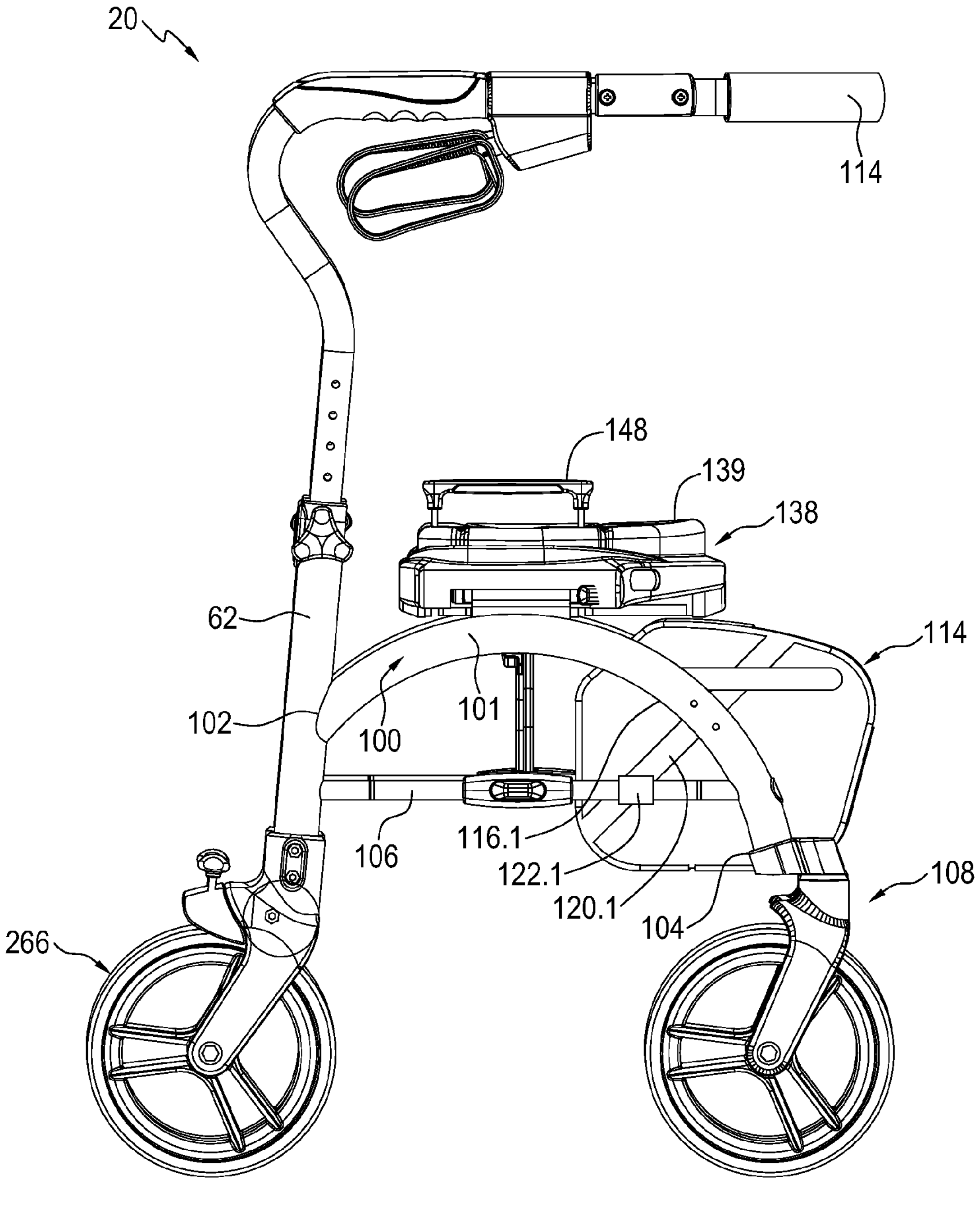
FIG. 2 is a side elevation view of the walker apparatus of FIG. 1.
Figure 21:
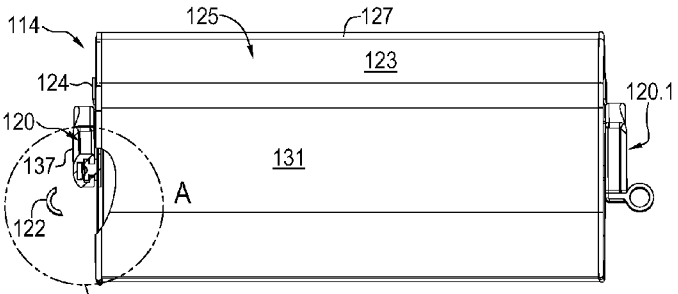
FIG. 21 is a rear elevation view of the collapsible basket of FIG. 19.
Figure 21A:
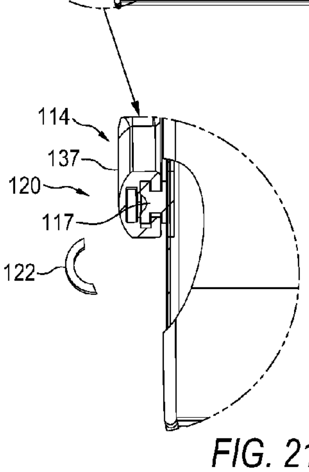
FIG. 21A is an enlarged view of FIG. 21 illustrating a connection bracket and an insert shaped to be received by the connection bracket for thereby mounting the collapsible basket.

As seen in FIG. 2, connection bracket 120.1, and thus grooved projection 117 seen in FIG. 21A, extend in a substantially radial direction relative to support member 100. Also as seen in FIG. 2, the connection bracket is angled relative to rod 106. Connection bracket 120 is substantially similar corresponds to the corresponding support member 102 and rod 105. The collapsible basket 114 is thereby slidably securable with and removable from the walker apparatus 20.

Figure 23:
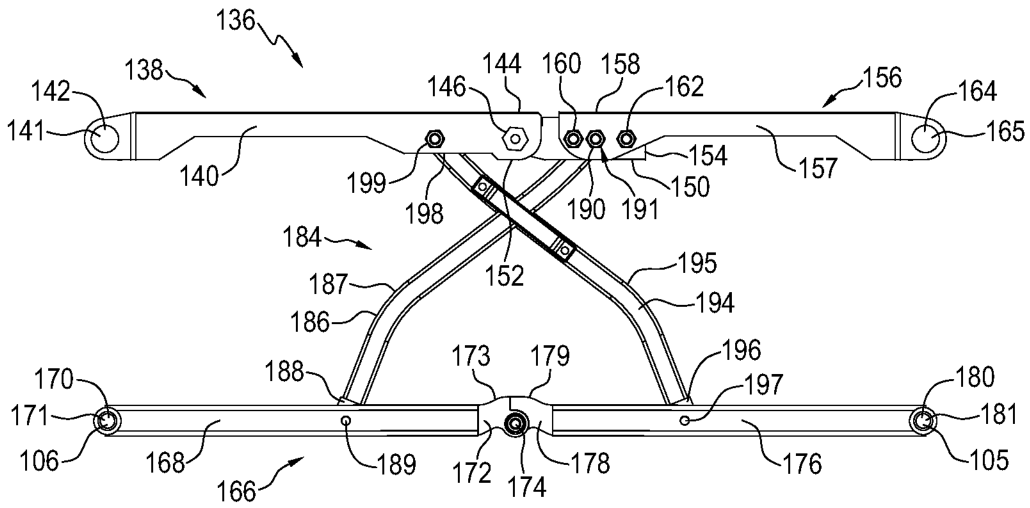
FIG. 23 is a front elevation view of a folding mechanism in an extended mode, according to one embodiment of the invention.
Figure 24:
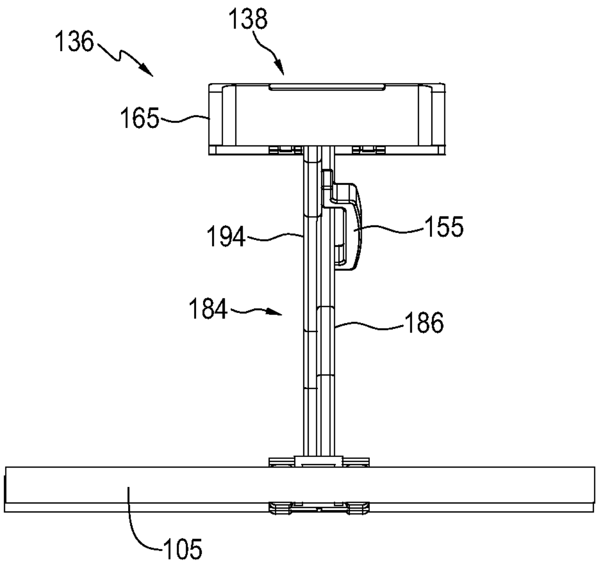
FIG. 24 is a side elevation view of the folding mechanism of FIG. 23.
Figure 25:
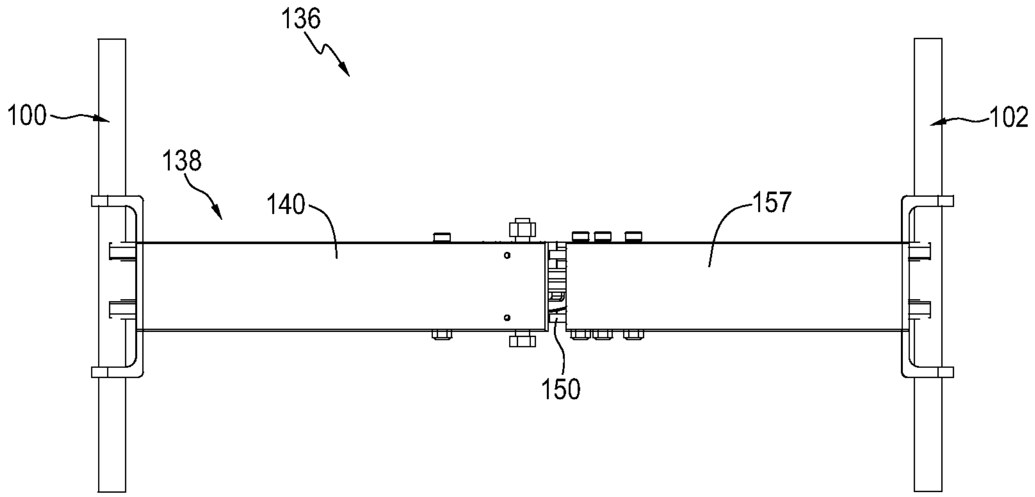
FIG. 25 is a top plan view of the folding mechanism of FIG. 23 in the extended mode.

The walker apparatus 20 includes a folding mechanism 136 as best shown in an unfolded mode in FIGS. 23 to 25. The folding mechanism may be referred to as a means for bringing together the frame members 22 and 24 for folding the walker. The folding mechanism 136 includes a pair of spaced-apart inner frame members 138 and 166. Inner frame member 136 includes a first part 140 and a second part 157, both of which may also be said to be part of seat 139. The first part 140 has a first end 142 that pivotally receives and thereby pivotally connects to the support member 100 via a first extended pivot rod 141, as shown by FIG. 23 in combination with FIG. 1. The first part 140 has a second end 144 spaced-apart from the first end 142. A pivot 146 at the second end 144 pivotally connects the first part 140 to a hinge member 150.

The second part 157 includes a first end 158 with a bolt 160 that connects the second part 157 to the hinge member 150. Bolt 162 near the first end 158 also connects the second part 157 to the hinge member 150. The first part 140 and the second part 157 of the inner frame member 138 are thereby hingedly connected together. The second part 157 has a second end 164 which is spaced-apart from the first end 15. The second end pivotally receives and thereby pivotally connects to the support member 102 via a second extended pivot rod 165, as shown by FIG. 23 in combination with FIG. 1.

The inner frame member 166 includes a first part 168 and a second part 176 that are pivotally connected together via pivot 174. The first part 168 has a first end 170 with a connector 171 that pivotally receives and thereby pivotally connects with the rod 106. The first part 168 has a second end 173 with teeth 172 extending therefrom above and over top of the pivot 174. The second part 176 has a first end 179 with teeth 178 extending therefrom above and over top of the pivot 174. The teeth 172 and 178 are positioned to inter-engage in an over-the-center action in the extended mode and thereby inhibit further movement of the inner frame members towards the lower ends of the outer frame members. The second part has a second end 180 with a connector 181 that pivotally receives and thereby pivotally connects with the rod 105. Rods 105 and 106 thus function in part as pivot rods.

The folding mechanism 136 includes a pair of link members 184 including a first link member 186 and a second link member 194 which form an x-shaped arranged when fully open. The first link member 186 pivotally connects at a first end 188 via pivot 189 to the first part 168 of the inner frame member 166. The first link member 186 pivotally connects at a second end 190 via pivot 191 to the second part 157 of the inner frame member 157 near the first end 158. The first link member 186 includes a bend 187 that extends outwardly towards the adjacent outer frame member 22. In this example, the bend 187 extends towards the first end 142 of the first part 140 of the inner frame member 138.

The second link member 194 pivotally connects at a first end 196 via pivot 197 to the second part 176 of the inner frame member 166. The second link member 194 pivotally connects at a second end 198 via pivot 199 to the first part 140 of the inner frame member 138 near the second end 144. The second link member 194 includes a bend 195 that extends outwardly towards the outer frame member 24. In this example, the bend 195 extends towards the second end 164 of the second part 157 of the inner frame member 138. A square bracket 155 outwardly extends from the second link member 194 to enable the first link member 186 to slidably pass therethrough. The pair of link members 184 thereby diagonally extend between and operatively connect the inner frame members 138 and 166 together.

Figure 26:
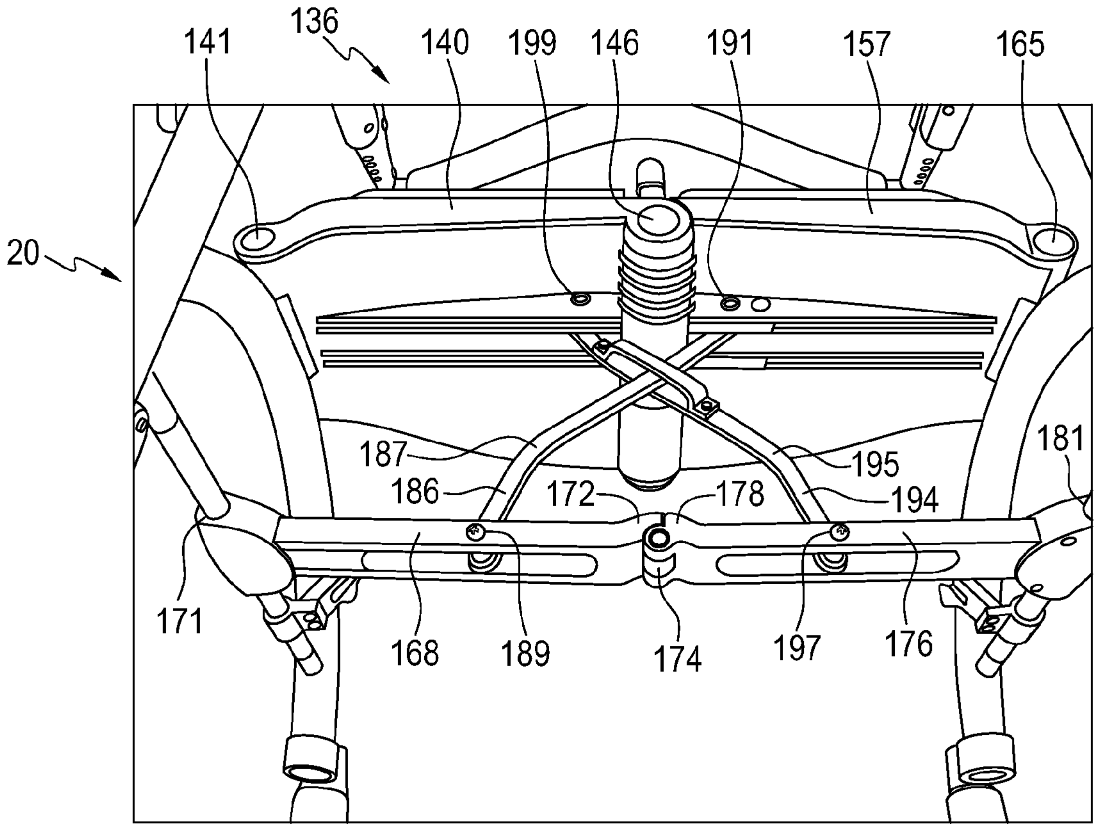
FIG. 26 is a rear, bottom perspective view of the folding mechanism in the extended mode together with the walker apparatus.
Figure 27:
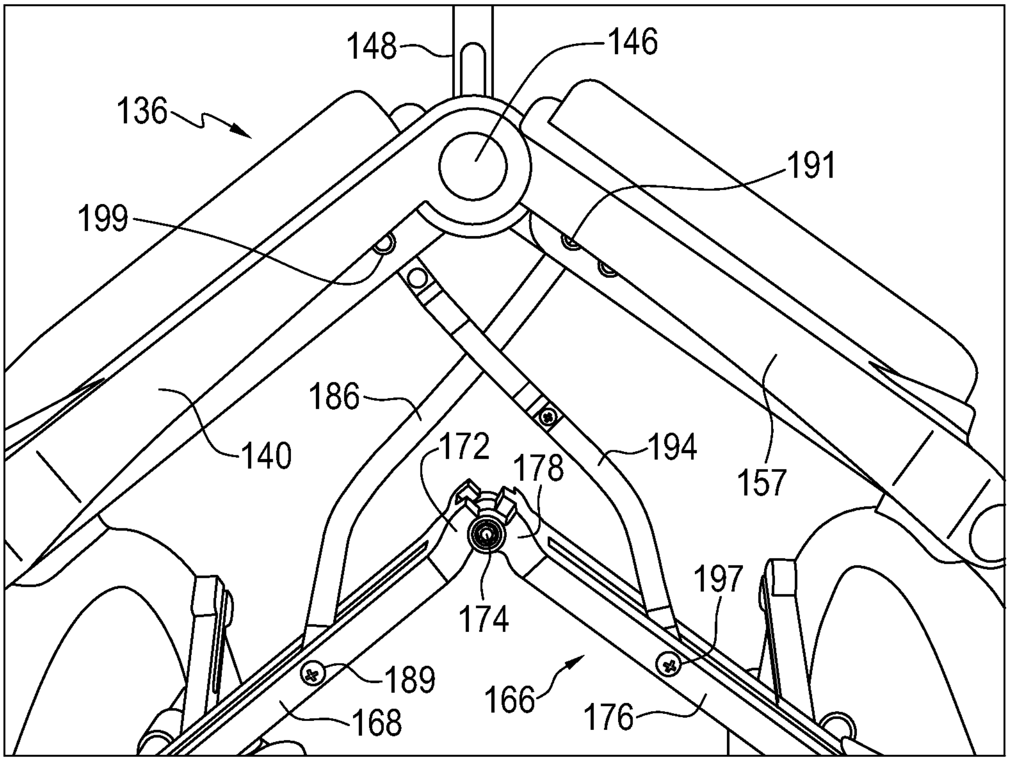
FIG. 27 is a rear elevation view of the folding mechanism of FIG. 26 in a partially folded mode.
Figure 28:
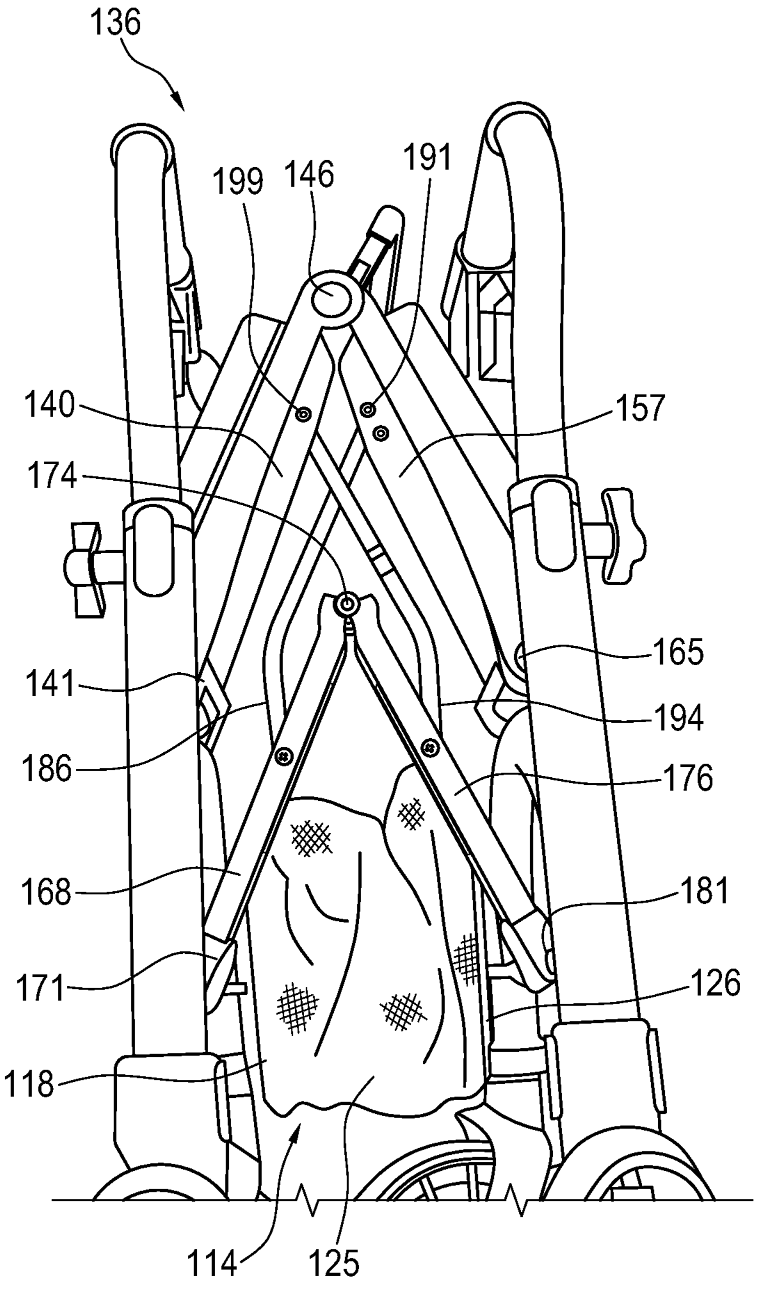
FIG. 28 is a rear elevation view of the folding mechanism and walker apparatus in a fully folded mode.
Figure 29:
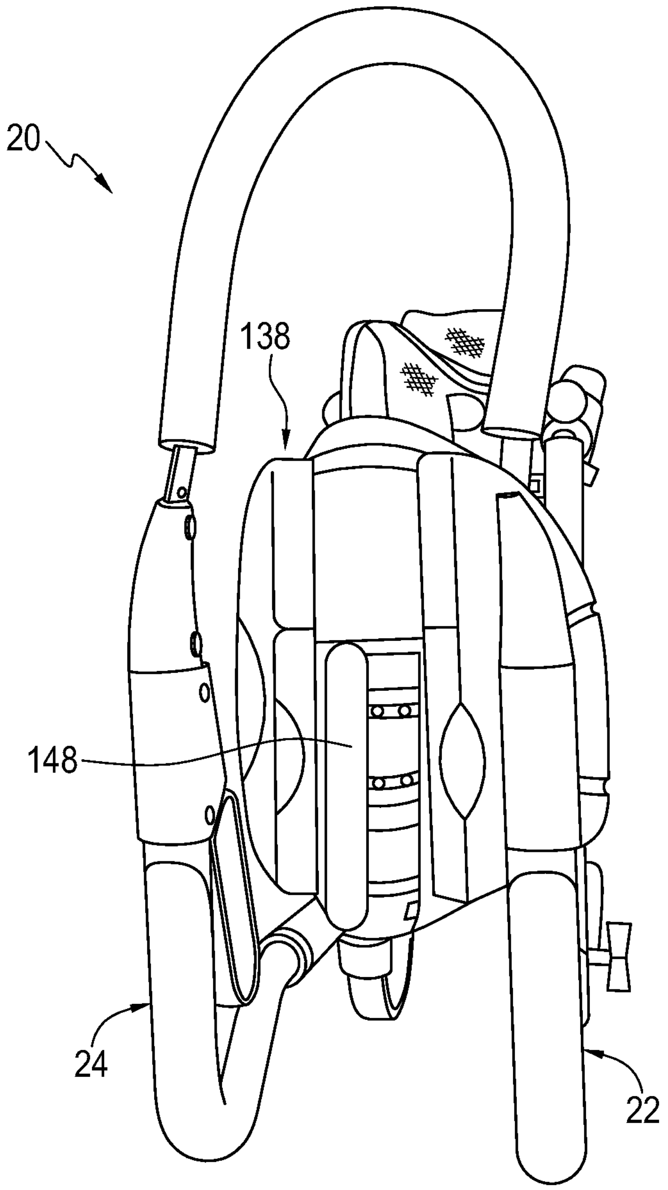
FIG. 29 a top plan view of the walker apparatus illustrated in FIG. 28 in the fully folded mode.
Figure 30:
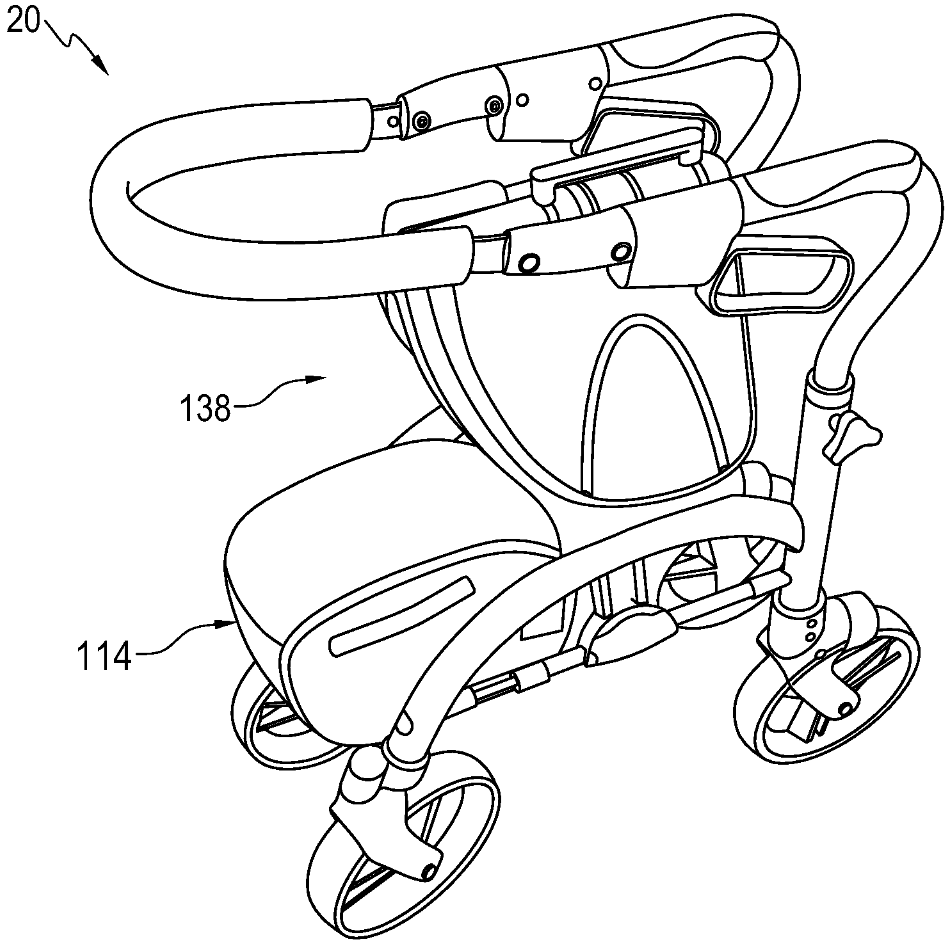
FIG. 30 a top, front isometric view of the walker apparatus in the fully mode.

The operation of the folding mechanism 136 is illustrated in FIGS. 26 to 30. FIG. 26 shows the folding mechanism 136 on the walker apparatus 20 in the unfolded or fully open mode. FIG. 27 shows the folding mechanism 136 in a partially folded mode. The user pulls the seat handle 148 upwards from the perspective of the FIG. 27. This causes the first part 140 and the second part 157 of the inner frame member 136 to fold through pivot 146 together and towards each other. Because the link members 185 and 194 are connected close to the seat handle 148, the actuation of the seat handle 148 also causes the first link member 186 and the second link member 194 to pull the first part 168 and the second part 176 of the inner frame member 166 to fold together and towards each other by means of pivot 174. The inner frame members continue to fold together until a fully folded mode is reached as shown in FIGS. 28 to 30. The foldable walker 20 is thereby laterally folded together in a compact, upright manner, with the outer frames 22 and 24 coming together. Advantageously, the foldable walker 20 may remain standing in the fully folded mode and be moved like a piece of luggage on wheels.

The structure of the present invention provides many advantages. For the brake pad assembly, because both the brake pad mechanism 200 and means 214 for connecting and adjusting are within the brake housing 277, the life of these components is prolonged by the housing, inhibiting the entry of dirt and rocks therein. Also, the brake housing 277 provides a compact, streamline solution, covering the brake pad mechanism 211 and means 214 so as to protect the interior against general wear and tear, to inhibit damage from the user's feet, and to inhibit entanglement with the user's clothes, which ensures that the walker apparatus is safer. Conveniently, when the brake pad needs adjusting, the covering portion 261 is readily removable for accessing the means 214.

The brake rod of the present invention provides the advantage of being self-adjusting and without requiring user intervention or being accessible to the user. The gripping member 99 may slide along the brake rod until such time as braking is needed. The gripping member 99 continues to be engageable to operate for braking even if the thumb screw is loose, unscrewed, strip-threaded or otherwise damaged. This provides an added layer of safety for the user as it inhibits the user from tampering with or adjusting the brake rod assembly. It is provides the advantage of ensuring that braking still works when the user needs to brake but, for example, where the walker apparatus has been damaged through an accident, or where the user does not have the sufficient dexterity to make other adjustments.

The frame shape of the walker apparatus, and in particular the support members 100 and 102 with their arc-shape provide the advantage of allowing a light, aircraft-quality aluminum to be used but still maintaining high strength and support requirements. In one example, the structure with the seat 139 resting on the apexes of the support members provides a rated weight capacity of at least 300 lbs. Because the frame locates the seat 139 in the middle of the walker apparatus, that is, halfway between the wheels, the frame thereby provides a walker apparatus that is more stable and therefore safer.

The collapsible basket 114 has the advantage of requiring very few parts: simply two connectable end members each having a rigid peripheral portion with fabric stretching around therebetween. The basket 114 is more user-friendly in that it can remain connected to and need not be removed the walker apparatus when the walker is folded. The basket 114 connects and folds in such a manner as to not comprise the integrity of the support members 100 and 102 or other aspects of the walker frame. Because the sides 131 and 133 are made of netting as opposed to continuous fabric, this allows the basket 114 to fold even more easily.

The folding mechanism provides a structure that better promotes later support and is therefore more robust. The bends 187 and 195 offer more resistance to shear forces acting, for example, against the support members. Because the links 186 and 194 intersect, they inhibit torsional twisting of the frame of the walker apparatus. The inner frame members 136 and 166 further promote lateral support. This means that the folding mechanism only requires two cross links 186 and 194 for its functioning and therefore uses fewer parts. This results in the advantage of providing a folding mechanism that is easier to manufacture and thus less expensive. The bends 187 and 195 also enable the folding mechanism to fold laterally in a more compact manner.

Because the links 186 and 194 are spaced inwardly from the support members 100 and 102, this provides the walker apparatus with a folding mechanism that is more compact and less likely to tangle with the user's clothing. Also, it results in a folding mechanism that is more durable if the walker is dropped or otherwise damaged because the links 186 and 194 are adjacent to the support members 100 and 102 and seat 139.

Those skilled in the art will appreciate that many variations are possible within the scope of the inventive aspects of the walker apparatus. For example, instead of the folding mechanism 136, other means may be used for bringing together the frame members for folding the walker, as are known to those skilled in the art, for the non-folding inventive aspects of the walker apparatus.

For aspects of the invention other than the brake rod, those skilled in the art will appreciate that, instead of a brake rod, other means for actuating a brake pad mechanism may be used for the walker apparatus.

The handle bar assembly disclosed in the present invention is just by way of example. Those skilled in the art will appreciate that other means for engaging a brake pad mechanism may be used for the walker apparatus.

Those skilled in the art will appreciate that, instead of the brake pad mechanism 211, other brake pad means for braking at least one of the wheels may be used for the walker apparatus for its non-brake pad and non-brake housing inventive aspects. Likewise, other means 214 for connecting and adjusting the corresponding brake pad may be used for the walker apparatus for its non-brake pad and non-brake housing inventive aspects.

It will further be understood by a person skilled in the art that many of the details provided above are by way of example only and can be varied or deleted without departing from the scope of the invention as set out in the following claims.

What is claimed:

1. A collapsible walker comprising:

a pair of spaced-apart, arc-shaped support members, each having a proximal end, a distal end spaced-apart therefrom and an apex spaced therebetween;

a pair of elongate rods connecting to respective ones of the support members adjacent to the distal ends thereof and extending towards the proximal ends thereof;

a seat extending between and connecting to the apexes of the support members;

a basket having a pair of spaced-apart ends members extending between the support members; and a pair of connection brackets for connecting the end members to the support members, the connection brackets extending from adjacent the distal ends of respective ones of the support members to a respective ones of the elongate rods.

2. The apparatus as claimed in claim 1, wherein each of the connection brackets comprises a first connector fastened to its respective one of the support members at a location spaced-apart from the distal end thereof and a second connector fastened to its respective one of the elongate rods.

3. The walker as claimed in claim 1, wherein the elongate rods function in part as pivot rods and wherein the walker further includes a folding mechanism for laterally folding the walker, the folding mechanism extending between and pivotally connecting to respective ones of the elongate rods.

4. The walker as claimed in claim 1, further including a folding mechanism for laterally folding the walker, the folding mechanism extending between and pivotally connecting to respective ones of the elongate rods.

5. The walker as claimed in claim 3, wherein the folding mechanism pivotally connects with the seat and is positioned adjacent to both the seat and the basket.

6. The walker as claimed in claim 4, wherein the folding mechanism pivotally connects with the seat and is positioned adjacent to both the seat and the basket.

7. The walker as claimed in claim 1, wherein the walker is laterally foldable, and wherein the basket includes a flexible basket member extending about, extending between and being supported by the end members, the end members being moveable towards each other and the basket member thereby folding to collapse the basket when folding the walker.

8. The walker as claimed in claim 1, wherein the walker is laterally foldable and wherein each of the end members has a rigid peripheral portion, and wherein the basket further includes a flexible basket member extending substantially about, extending between and being supported by the rigid peripheral portions of the end members, the end members being moveable towards each other and the basket member thereby folding to collapse the basket when folding the walker.

9. The walker as claimed in claim 8, wherein the rigid peripheral portions of the end members are wire loops.

10. The walker as claimed in claim 1, wherein the seat includes a first part and a second part pivotally connecting to the first part, each of the parts of the seat connecting to a respective one of the apexes of the support members.

11. The walker as claimed in claim 10, further including a pair of pivot rods connecting to respective ones of the apexes of the support members, the pivot rods aligning with respective ones of the support members, the first part and the second part of the seat pivotally connecting to respective ones of the pivot rods.

12. The walker as claimed in claim 1, wherein the support members are upwardly convex and continuously curved and wherein the curvature of the support members forward of the seat is equal to the curvature of the support members rearward of the seat, the support members thereby supporting the seat.

13. The walker as claimed in claim 1 wherein each of the connection brackets is shaped through a grooved housing, and wherein the walker further includes grooved projections shaped to be received by the grooved housings, the brackets connecting to the support members, and the projections connecting to the end members.

14. The walker as claimed in claim 1, further including a pair of extended projections shaped to be received by respective ones of the connection brackets, the connection brackets connecting to one of the end members and the support members, and the projections connecting to the other of the end members and the support members.

15. The walker as claimed in claim 1, further including a folding mechanism extending between the support members, the folding mechanism being positioned between the proximal and distal ends of the support members.

16. The walker as claimed in claim 1, the connection brackets enabling the basket to be slidably securable with and removable from the walker.

17. The walker as claimed in claim 1 wherein the connection brackets extend in a substantially radial direction relative to the support members.

18. The walker as claimed in claim 14 wherein the connection brackets and the grooved projections extend in a substantially radial direction relative to the support members.

19. The walker as claimed in claim in claim 1, wherein the connection brackets are angled relative to the elongate rods.

* * * * *

UNITED STATES PATENT AND TRADEMARK OFFICE
CERTIFICATE OF CORRECTION

PATENT NO. : 9,192,541 B2
APPLICATION NO. : 13/858563
DATED : November 24, 2015
INVENTOR(S) : Julian Liu It is certified that error appears in the above-identified patent and that said Letters Patent is hereby corrected as shown below:

IN THE CLAIMS

Column 11 Line 59 thru Column 12 Line 7 should read

1. A collapsible walker comprising:
a pair of spaced-apart, arc-shaped support members, each having a proximal end, a distal end spaced-apart therefrom and an apex spaced therebetween;
a pair of elongate rods connecting to respective ones of the support members adjacent to the distal ends thereof and extending towards the proximal ends thereof;
a seat extending between and connecting to the apexes of the support members;
a basket having a pair of spaced-apart end members extending between the support members; and
a pair of connection brackets for connecting the end members to the support members, the connection brackets extending from adjacent the distal ends of respective ones of the support members to respective ones of the elongate rods.

Column 13 Lines 18-19 should read

19. The walker as claimed in claim 1, wherein the connection brackets are angled relative to the elongate rods.

Signed and Sealed this
Ninth Day of February, 2016

Michelle K. Lee
*Director of the United States Patent and Trademark Office*